(12) United States Patent
Li et al.

(10) Patent No.: US 11,778,511 B2
(45) Date of Patent: Oct. 3, 2023

(54) TRANSMISSION PARAMETER PROBING AND SEARCHING FOR AGILE LINK QUALITY ADAPTATION

(71) Applicant: Kabushiki Kaisha Toshiba, Minato-ku (JP)

(72) Inventors: Shengyang Li, Bristol (GB); Usman Raza, Bristol (GB); Aftab Khan, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 373 days.

(21) Appl. No.: 16/575,025

(22) Filed: Sep. 18, 2019

(65) Prior Publication Data

US 2021/0084540 A1    Mar. 18, 2021

(51) Int. Cl.

| | |
|---|---|
| *H04W 28/20* | (2009.01) |
| *H04B 17/318* | (2015.01) |
| *H04L 43/12* | (2022.01) |
| *H04W 24/08* | (2009.01) |
| *H04W 28/02* | (2009.01) |
| *H04L 43/0811* | (2022.01) |

(Continued)

(52) U.S. Cl.
CPC .......... *H04W 28/20* (2013.01); *H04B 17/318* (2015.01); *H04L 43/12* (2013.01); *H04W 24/08* (2013.01); *H04W 28/0273* (2013.01)

(58) Field of Classification Search
None
See application file for complete search history.

(56) References Cited

U.S. PATENT DOCUMENTS

| 8,301,139 B2 | 10/2012 | Lotze et al. |
| 10,355,810 B1 * | 7/2019 | Muthuswamy ....... H04L 1/0009 |

(Continued)

OTHER PUBLICATIONS

Office Action dated Mar. 29, 2021 issued in related U.S. Appl. No. 16/574,992.

(Continued)

*Primary Examiner* — Jeffrey M Rutkowski
*Assistant Examiner* — Ning Li
(74) *Attorney, Agent, or Firm* — Oblon, McClelland, Maier & Neustadt, L.L.P.

(57) ABSTRACT

According to an embodiment there is provided a method for managing wireless communication between a sending wireless device and a receiving wireless device in a wireless network, the method comprising the sending wireless device: transmitting to the receiving wireless device one or more uplink communications using a first transmission setting; determining whether a link quality of the communication link falls outside of a predefined range; and in response to determining that the link quality falls outside of the predefined range: determining at least first and second probing transmission settings that differ from each other and from the first transmission setting; transmitting a first probing transmission using the first probing transmission setting and a second probing transmission using the second probing transmission setting; receiving from the receiving wireless device a selection of one of the first and second probing transmission settings; and adopting the selected probing transmission setting for use with future transmissions to the receiving wireless device.

20 Claims, 13 Drawing Sheets

(51) Int. Cl.
*H04W 40/08* (2009.01)
*H04W 52/14* (2009.01)
*H04W 52/24* (2009.01)
*H04W 28/18* (2009.01)

(56) References Cited

U.S. PATENT DOCUMENTS

| | | | |
|---|---|---|---|
| 10,868,633 B2* | 12/2020 | Shimoji | H04L 5/0055 |
| 2005/0213674 A1 | 9/2005 | Kobayashi | |
| 2013/0044028 A1* | 2/2013 | Lea | H01Q 21/065 |
| | | | 342/359 |
| 2013/0121173 A1 | 5/2013 | Chen et al. | |
| 2014/0071840 A1 | 3/2014 | Venancio | |
| 2015/0063336 A1* | 3/2015 | Cherian | H04W 48/16 |
| | | | 370/338 |
| 2015/0281908 A1* | 10/2015 | Venkatraman | G01S 5/02521 |
| | | | 455/456.6 |
| 2016/0057647 A1* | 2/2016 | Sullivan | H04W 28/04 |
| | | | 370/253 |
| 2017/0230074 A1* | 8/2017 | Rose | H04B 1/1036 |
| 2018/0007691 A1 | 1/2018 | Hall et al. | |
| 2018/0167937 A1 | 6/2018 | Savelli et al. | |
| 2018/0249425 A1* | 8/2018 | Nakano | H04W 52/24 |
| 2018/0302906 A1* | 10/2018 | Baldemair | H04W 72/10 |
| 2019/0191387 A1* | 6/2019 | Shakya | H04W 52/143 |
| 2019/0305875 A1* | 10/2019 | Xue | H04B 7/0695 |
| 2020/0037271 A1 | 1/2020 | Coutelou et al. | |
| 2020/0068390 A1 | 2/2020 | Knapp et al. | |
| 2020/0136661 A1* | 4/2020 | Eliaz | H04B 1/0475 |
| 2020/0145799 A1* | 5/2020 | Baghel | H04L 1/0018 |
| 2020/0359290 A1* | 11/2020 | Watson | H04B 17/327 |
| 2021/0013990 A1* | 1/2021 | Chen | H04W 24/02 |
| 2021/0058171 A1* | 2/2021 | Alasti | H04B 17/373 |
| 2021/0058834 A1* | 2/2021 | Paladugu | H04W 36/00835 |
| 2021/0068097 A1* | 3/2021 | Pedersen | H04L 1/0003 |
| 2021/0219244 A1* | 7/2021 | Wernersson | H04W 52/242 |

OTHER PUBLICATIONS

Orestis Georgiou, et al., "Low Power Wide Area Network Analysis: Can LoRa Scale?", IEEE Wireless Communications Letters, vol. 6, No. 2, Apr. 2017, pp. 162-165.

Shengyang Li, et al., "How Agile is the Adaptive Data Rate Mechanism of LoRaWAN?", IEEE GLOBECOM, 2018, 6 pages.

LoRaWAN Specification 1.1, 1, p. 1.

Alexandru-Ioan Pop, et al., "Does Bidirectional Traffic Do More Harm Than Good in LoRaWAN Based LPWA Networks?", IEEE, Dec. 2017, 6 pages.

Usman Raza, et al., "Low Power Wide Area Networks: An Overview", IEEE, 2017, 19 pages.

* cited by examiner

US 11,778,511 B2

TRANSMISSION PARAMETER PROBING AND SEARCHING FOR AGILE LINK QUALITY ADAPTATION

TECHNICAL FIELD

The present disclosure relates to systems and methods for managing transmission settings for one or more wireless devices in a wireless network.

BACKGROUND

In recent years, there has been a rapid evolution in the development of Internet of Things (IoT) technologies. This allows many devices to be connected within a network to share information and is particularly applicable to the integration of wireless network connectivity into traditionally non-connected devices. Having said this, increased network connectivity puts additional strain on the wireless network infrastructure.

The Low Power Wide Area (LPWA) network technologies were born out of the need to connect many devices located in wide geographical areas at a relatively low cost and energy consumption. Long Range Wide Area Network (LoRaWAN) is one of the most promising LPWA technologies due to its simplicity compared to alternative methods such as multihop mesh networks. In order to allocate limited radio resources for reliable and efficient communication, LoRaWAN adapts dynamically the communication parameters of the network devices through an Adaptive Data Rate (ADR) mechanism.

Having said this, there are issues with the choice of the most appropriate transmission parameters for each device in the network. LoRaWAN can suffer from problems with adapting to link changes in real world environments, collisions between transmissions in larger networks, and energy efficiency.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

Figure 1:
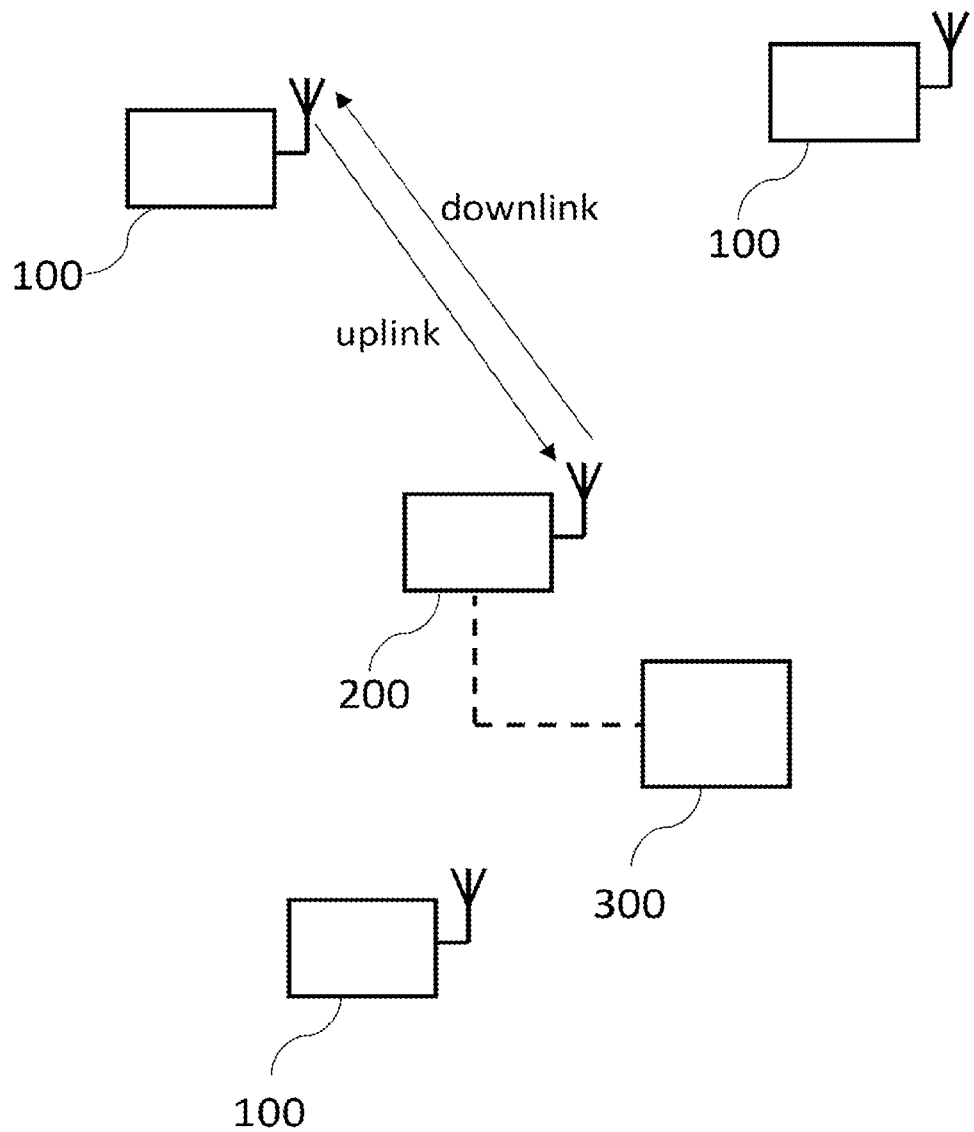
FIG. 1 shows a wireless network according to an embodiment.

The embodiments described herein provide more effective and efficient methods of coordinating transmissions. The embodiments are particularly suited for use in a low power wide area network that can be effectively scaled and adapted to real world conditions.

According to an embodiment wireless device for wirelessly communicating with a further wireless device in a wireless network, the wireless device comprising: a wireless module for transmitting and receiving wireless communications over a communication link with the further wireless device; and a controller configured to: transmit to the further wireless device, via the wireless module, one or more communications using a first transmission setting; determine whether a link quality of the communication link falls outside of a predefined range; and, in response to determining that the link quality falls outside of the predefined range: determine at least first and second probing transmission settings that differ from each other and from the first transmission setting; transmit to the further wireless device, via the wireless module, a first probing transmission using the first probing transmission setting and a second probing transmission using the second probing transmission setting; receive from the further wireless device, via the wireless module, a selection of one of the first and second probing transmission settings; and configure the wireless module to use the selected probing transmission setting with future transmissions to the further wireless device.

By utilizing multiple probing transmissions, the appropriate transmission parameters can be reached more quickly, thereby reducing network downtime and increasing network efficiency.

The wireless device may be a node (e.g. an end device) and the further wireless device may be an access point or gateway.

According to an embodiment, the first transmission setting falls within a first link budget, determining whether the link quality of the communication link falls outside of the predefined range comprises determining whether the link quality falls below a minimum link quality, and the controller is configured to, in response to determining that the link quality falls below the minimum link quality, determine the first and second probing transmission settings such that each of the first and second probing transmission settings provides a link budget that is higher than the first link budget.

A link budget is an accounting of gains and losses over the communication link and is indicative of the likelihood that a transmission over the communication link will be received.

According to an embodiment, determining the first and second probing transmission settings such that each of the first and second probing transmission settings provides a link budget that is higher than the first link budget comprises: determining a first probing link budget for the first probing transmission setting that is higher than the first link budget by a predefined step size; determining a second probing link budget for the second probing transmission setting that is higher than the first probing link budget by a predefined window; and determining the first and second probing transmission settings based on the first and second probing link budgets respectively.

According to an embodiment, determining the first and second probing transmission settings based on the first and second probing link budgets respectively comprises: in response to the first probing link budget being below a maximum link budget, selecting for the first probing transmission setting a transmission setting falling within the first probing link budget; in response to the second probing link budget being below the maximum link budget, selecting for the second probing transmission setting a transmission setting falling within the second probing link budget; and in response to one or both of the first and second probing link budgets being greater than or equal to the maximum link budget, selecting for the one or both of the first and second probing link budgets a corresponding transmission setting falling within the maximum link budget. Accordingly, a maximum link budget may be maintained and the system may ensure that the maximum link budget is not exceeded.

According to an embodiment, determining whether the link quality falls below a minimum link quality comprises determining whether a predefined number of transmission attempts have been made by the wireless device using the first transmission settings without receiving any acknowledgement of receipt from the further wireless device.

According to an embodiment, determining whether the link quality of the communication link falls outside of the predefined range comprises receiving an indication from the further wireless device that the link quality falls outside of the predefined range. The indication may be a set of transmission settings received from the further wireless device and/or an instruction or message informing the wireless device that the link quality falls outside the predefined range.

According to an embodiment, each of the first transmission setting and the first and second probing transmission settings comprises one or more of a transmission power setting and a coding scheme setting. The coding scheme setting may comprise a spreading factor setting.

According to an embodiment, determining at least a first and second probing transmission settings that differ from each other and from the first transmission setting comprises receiving from the further wireless device one or more communications that indicate the first and second probing transmission settings.

According to an embodiment there is provided a computer implemented method for managing transmission settings for one or mode wireless devices within a wireless network, the method including: in response to a receiving wireless device receiving one or more uplink transmissions from a sending wireless device over a wireless communication link, determining whether a link quality of the wireless communication link falls outside of a predefined range; in response to determining that the link quality falls outside of the predefined range: determining at least first and second probing transmission settings that differ from each other and from the first transmission setting; sending to the sending wireless device an instruction for the sending wireless device to use the first probing transmission setting in a first probing transmission and the second probing transmission in a second transmission; in response to the receiving wireless device receiving the first and second probing transmissions, determining a first probing link quality for the first probing transmission and a second probing link quality for the second probing transmission; selecting one of the first and second probing transmission settings based on the first probing link quality and second probing link quality; and sending to the sending wireless device an instruction for the sending wireless device to use the selected one of the first and second probing transmission settings in future transmissions.

The sending wireless device may be a node (e.g. an end device). The receiving wireless device may be an access point or gateway.

According to an embodiment, the one or more uplink transmissions are sent by the sending wireless device using one or more link budgets; determining whether the link quality falls outside of the predefined range comprises determining whether a link quality of the largest link budget of the one or more link budgets falls below the predefined range; and, in response to determining that the largest of the link budgets falls below the predefined range, the first and the second probing transmission settings are determined such that each of the first and second probing transmission settings provides a link budget that is higher than the largest of the link budgets. In a scenario where there is only one link budget, the only link budget may be determined to be the largest link budget.

According to an embodiment, determining the first and second probing transmission settings such that each of the first and second probing transmission settings provides a link budget that is higher than the largest of the link budgets comprises: determining a first probing link budget for the first probing transmission setting that is higher than the first link budget by a predefined step size; determining a second probing link budget for the second probing transmission setting that is higher than the largest probing link budget by a predefined window; and determining the first and second probing transmission settings based on the first and second probing link budgets respectively.

According to an embodiment, determining the first and second probing transmission settings based on the first and second probing link budgets respectively comprises: in response to the first probing link budget being below a maximum link budget, selecting for the first probing transmission setting a transmission setting falling within the first probing link budget; in response to the second probing link budget being below the maximum link budget, selecting for the second probing transmission setting a transmission setting falling within the second probing link budget; and, in response to one or both of the first and second probing link budgets being greater than or equal to the maximum link budget, selecting for the one or both of the first and second probing link budgets a corresponding transmission setting falling within the maximum link budget.

According to an embodiment, determining whether a link quality of the largest link budget of the one or more link budgets falls below the predefined range comprises determining whether a received signal strength corresponding to the largest link budget is less than a lower limit for the signal strength.

According to an embodiment, the one or more uplink transmissions are sent by the sending wireless device using one or more link budgets; determining whether the link quality falls outside of the predefined range comprises determining whether a link quality of the smallest link budget of the one or more link budgets falls above the predefined range; and, in response to determining that the smallest of the link budgets falls above the predefined range, the first and the second probing transmission settings are determined such that each of the first and second probing transmission settings provides a link budget that is lower than the smallest of the link budgets.

According to an embodiment, determining whether the link quality of the smallest link budget of the one or more link budgets falls above the predefined range comprises determining whether a received signal strength corresponding to the smallest link budget is greater than an upper limit for the signal strength.

According to an embodiment, selecting one of the first and second probing transmission settings based on the first probing link quality and the second probing link quality comprises, in response to the link quality for each of the first and second probing transmissions falling within the predefined range, selecting the one of the first and second probing transmission settings that provides the lowest frame loss.

The frame loss may be determined from a frame number provided in each transmission and a number of received transmissions. A respective frame loss measurement may be determined for each of the first and second probing transmission settings.

According to an embodiment there is provided a non-transitory computer readable medium comprising executable code that, when executed by a processor, causes the processor to perform any of the methods described above.

According to an embodiment there is provided a computing system comprising a processor configured to perform any of the methods described above.

According to an embodiment there is provided a method for managing wireless communication between a sending wireless device and a receiving wireless device in a wireless network, the method comprising the sending wireless device: transmitting to the receiving wireless device one or more uplink communications using a first transmission setting; determining whether a link quality of the communication link falls outside of a predefined range; and in response to determining that the link quality falls outside of the predefined range: determining at least first and second probing transmission settings that differ from each other and from the first transmission setting; transmitting a first probing transmission using the first probing transmission setting and a second probing transmission using the second probing transmission setting; receiving from the receiving wireless device a selection of one of the first and second probing transmission settings; and adopting the selected probing transmission setting for use with future transmissions to the receiving wireless device.

As mentioned above, LoRaWAN provides an Adaptive Data Rate (ADR) mechanism that dynamically adapts the communication parameters of the devices within the network.

In an attempt to provide reliable and efficient communications without sacrificing the property of being a Low Power Wide Area Network (LPWA), LoRaWAN provides the devices in the network with various adjustable transmission parameters, such as transmission power (TP) and spreading factor (SF).

Transmission power controls the power that is used for each transmission, for instance, by controlling the amplitude of the transmitted electromagnetic signals. A higher transmission power increases the probability of successful receipt of the transmission but also reduces the energy efficiency of the system and increases interference with neighboring transmissions.

Spreading factor represents the time over which a message is spread. Higher spreading factors represent longer transmission time, thereby increasing the time-on-air (increasing the likelihood of collision with other transmissions) but also increasing the probability of successful receipt of the transmission. A higher spreading factor therefore reduces the data rate for the transmission.

More specifically, the spreading factor is a measure of the number of chips used for the transmission of each symbol. SF relates to chip and symbol rates differently depending on the modulation scheme. The two equations below corresponds with LoRa and direct-sequence spread spectrum techniques respectively.

$$2^{SF} = \frac{\text{chip rate}}{\text{symbol rate}}$$

$$SF = \frac{\text{chip rate}}{\text{symbol rate}}$$

In a spread spectrum communication scheme, such as LoRa, a chip is a bit that is transmitted over the channel. They are called chips to distinguish them from bits of the transmitted message, which are encoded before transmission.

Different selections of transmission power and spreading factor can lead to different communication reliability and energy consumption. The link budget of a link accounts for losses and gains associated with wireless medium, communication system circuitry, antenna gains of transmitters and receivers, etc. The link budget is affected by the transmission parameters for the communication link. Among other things, the link budget is associated with signal transmission power as well as receiver sensitivity. Increasing transmission power increases the link budget. Moreover, increasing spreading factor also increases receiver sensitivity i.e., the receiver's ability to successfully decode weaker signals. Therefore, a signal has high link budget when it can afford high attenuation between the two communicating devices without being lost on the receiving end.

An increase in SF increases the time on air. The total energy invested in the transmission of a single symbol increases correspondingly. An increase of SF by one results in a single symbol being represented by twice the number of chips (see the formula of sf, chip rate and symbol rate for LoRa above), but also requires twice the radio on-time. Similarly, if SF remains unaltered but TP is increased by 3 dBm, more energy is invested in the signal but without spreading it over time. Putting more energy in a single symbol increases the range because the signal remains detectable even if more energy is lost during transmission. LoRa's sensitivity improves by 3 dBm for each increment in SF. A 3 dBm increase of TP or an increment of SF changes the link budget in the same manner. The link budget can be calculated using:

$$\text{Link Level Budget Level} = (SF - SF_{min}) + \left(TP - \frac{TP_{min}}{3\ dBm}\right) + 1$$

where for LoRa $SF_{min}=7$, $TP_{min}=2$ dBm. The offset of one is added because the lowest link budget level is one.

Using higher TP or SF increases the link budget and achieves better communication reliability for the links; however, it also increases the overall energy consumption.

Therefore, LoRaWAN introduces the Adaptive Data Rate (ADR) mechanism to decide these transmission parameter values dynamically.

Studies indicate that the official ADR mechanism proposed by the LoRaWAN Alliance has a number of issues that limit the scalability, agility, and overall network throughput. In particular, as the network scales, the network throughput, reliability, and energy consumption degrade significantly. Moreover, the ADR mechanism is slow to adapt to inevitable changes in link conditions. This results in poor performance in terms of reliability.

The present application proposes an improved ADR mechanism that includes novel radio resource mechanisms to overcome these challenges. The proposed ADR mechanism, in comparison to the official ADR mechanism, doubles the data extraction rate for large network sizes with a similar level of energy consumption in our simulations. Similarly, the end devices using the improvements described herein converge on suitable communication settings in half of the time and energy consumption of the previous system.

There are a number of specific issues with the current ADR mechanism for LoRaWAN Networks.

Tolerance and Robustness

The current ADR mechanism gives suboptimal performance within real-world dynamic environments. It only considers the case when end devices are stationary together with stable radio channel conditions. However, fading in radio channels and link changes over time are unavoidable in practice. Complicated environments bring many difficulties with regard to deciding the link quality. If the link quality is estimated incorrectly, the resulting action for selecting transmission parameters will be wrong and cause further problems.

Previous ADR mechanisms determine the link quality by reception of downlink response. This approach only works if the missing downlink response is due to poor link quality. Having said this, there are many alternative reasons for a downlink response to be missed.

If the downlink response is lost due to congestion within the network then the current ADR mechanism would still mark this as a poor link quality even through the link quality may be acceptable. Equally, if the downlink response is occasionally received over a weak link due to natural signal strength variation then the determined link quality might be artificially inflated.

The current ADR mechanism is not able to distinguish these issues and therefore can record inaccurate link quality values. As the transmission parameters of the devices are set based on the link quality, this can result in transmission failures (for overestimation of link quality) and power inefficiency (for underestimation of link quality).

Agility of the Adaptive Data Rate Mechanism

The ADR mechanism plays a vital role in the performance of LoRaWAN networks. Besides determining how to assign suitable transmission parameters for each node in the network, the ADR algorithm faces another challenge: how quickly can the algorithm adjust to changes in link quality?

The ADR mechanism has been found to have significant flaws in terms of agility under different deployment scenarios. For instance, when the link quality of a node becomes worse, current ADR will try to increase the link budget by stepping up the transmission parameters one by one. This approach does not apply enough finesse. A delicate balance must be struck. The data rate should not be adapted for transient disturbances in the environment, but permanent changes must be taken into account quickly.

Energy Efficiency

The failure caused by scalability of LoRaWAN leads to large numbers of collisions between uplink messages sent to the gateway. The significant amount of collisions causes large energy consumption and poor performance. On the other hand, if the ADR lacks agility (takes time to settle on updated parameters), then a large number of packets sent by nodes will be wasted during the process of selecting suitable parameters, resulting in transmission and energy inefficiencies. Similarly, the inaccurate selection of parameters caused by incorrect link quality estimation causes collision and packet loss due to fading. Accordingly, the current ADR mechanism results in energy and transmission inefficiencies.

In light of the above, the embodiments described herein aim to improve transmission and energy efficiencies by providing more reliable link condition evaluation and more agile transmission parameter adaptation.

FIG. 1 shows a wireless network according to an embodiment. The network comprises a number of wireless devices, including wireless nodes 100 and a gateway 200 (an access point). The wireless nodes 100 may be end devices. Each wireless node 100 is configured to wirelessly communicate with the gateway 200. The network may be a LoRaWAN network. Each wireless node and gateway is a form of wireless device, in that it is able to communicate wirelessly with other wireless devices.

The gateway is connected to a network server 300 that helps to manage the network. The gateway 200 and network server 300 form the "network side" of the system, which is configured to manage the transmission parameters within the network. The methods described herein with reference to the network side may be implemented either in the gateway 200, in the network server 300, or a combination of both. Where the management functions are implemented in the gateway, the network server is optional.

Figure 2:
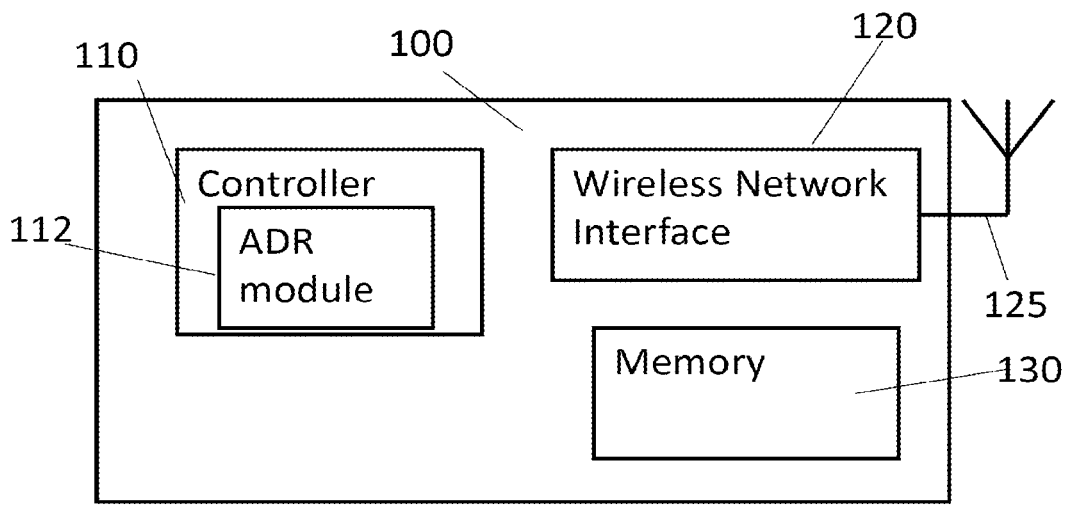
FIG. 2 shows a wireless node according to an embodiment.

FIG. 2 shows a wireless node 100 according to an embodiment. The wireless node 100 comprises a controller 110, a wireless network interface 120 connected to an antenna 125 and memory 130.

The wireless network interface 120 is configured to transmit and receive wireless communications via the antenna 125. The controller 110 comprises an Adaptive Data Rate (ADR) module 112.

The ADR module is software implemented within the controller 110 to control the controller 110 to monitor communications over the wireless interface 120 and to adjust the transmission parameters for the wireless node 100 according to the methods described herein.

Memory 130 is configured to store computer executable code for instructing the controller 110 to perform the functions described herein. The wireless node 100 may be configured to store data from received communications in the memory 130. The wireless node 100 may be configured to store transmission parameters in memory 130 for use in future transmissions.

Figure 3:
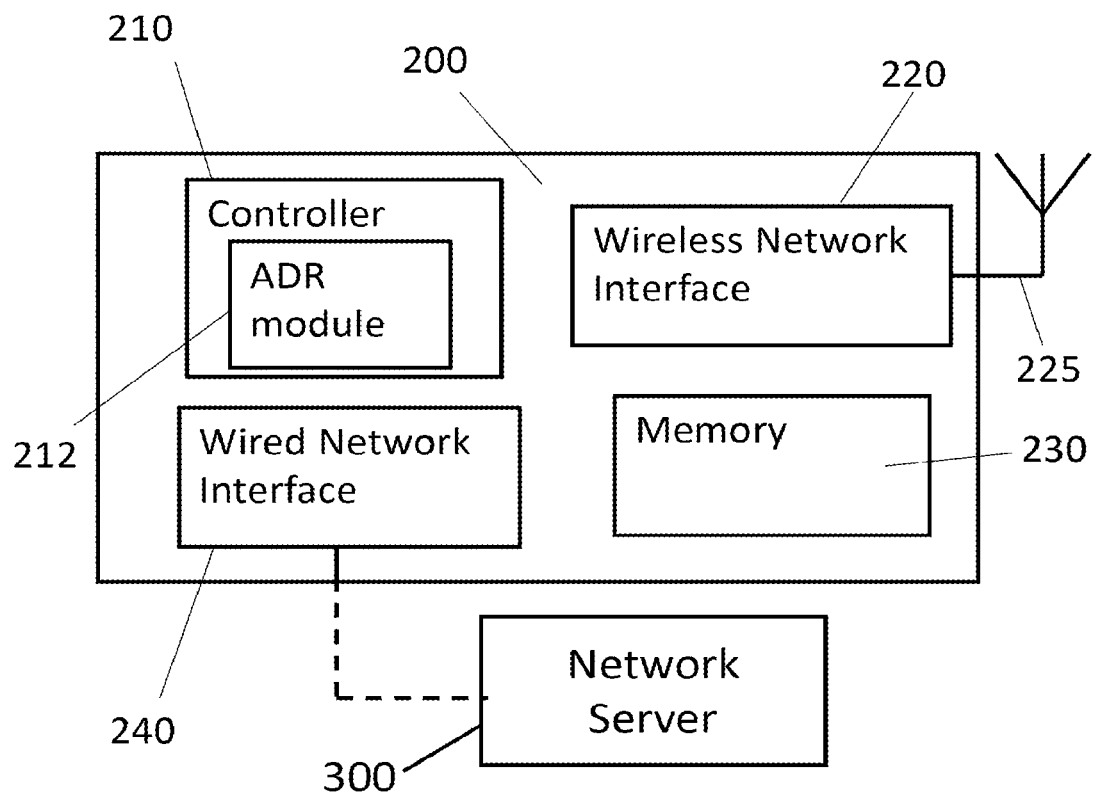
FIG. 3 shows a gateway according to an embodiment.

FIG. 3 shows a gateway 200 according to an embodiment. The gateway 200 is configured similarly to the wireless node 100 in that it also comprises a controller 210 including an ADR module 212, a wireless network interface 220 connected to an antenna 225, and memory 230. The gateway 200 further includes a wired network interface 240. The gateway 200 can be connected to the network server 300 through the wired network interface 240.

The wired network interface 240 is configured to communicate with external devices via a wired connection (shown as a dashed line in FIG. 3). Accordingly, the wireless nodes 100 may report to the gateway 200, which, in turn, can pass on information from the wireless nodes 100 to one or more external devices outside of the wireless network. Similarly, the gateway 200 can relay messages from the one or more external devices to the wireless nodes 100.

Whilst the embodiment of FIG. 3 shows the ADR controller 210 and the ADR module 212 as part of the gateway, the ADR controller 210 and the ADR module 212 can also exclusively reside on an external device such as the network server 300 connected to the wired network interface 240.

The ADR modules 112, 212 of the gateway 200 (or network server 300) and wireless nodes 100 manage the transmission parameters for their respective devices to avoid collisions within the network. Embodiments discussed herein relate to improvements to the functioning of the ADR modules 112, 212 to improve power consumption and transmission efficiency.

Two methods for improving performance are detailed herein:
1. More accurate link quality evaluation is achieved by monitoring the performance of uplink transmissions in terms of additional communication metrics such as frame loss, signal variation and received signal strength (e.g. the received signal strength indicator (RSSI)) instead of only monitoring reception of downlink acknowledgements (ACKs).
2. Improved responsiveness to changes in link quality is provided through probing and monitoring of performance of uplink transmissions based on multiple sets of transmission parameters rather than one set of transmission parameters.

Link Quality Awareness For Uplinks From Nodes To Gateways.

The objective is to adapt transmission parameters (e.g. SF and TP) at the transmitting devices (e.g. wireless nodes such as end devices) to provide sufficient link budget so that uplink transmissions are successful.

Figure 4:
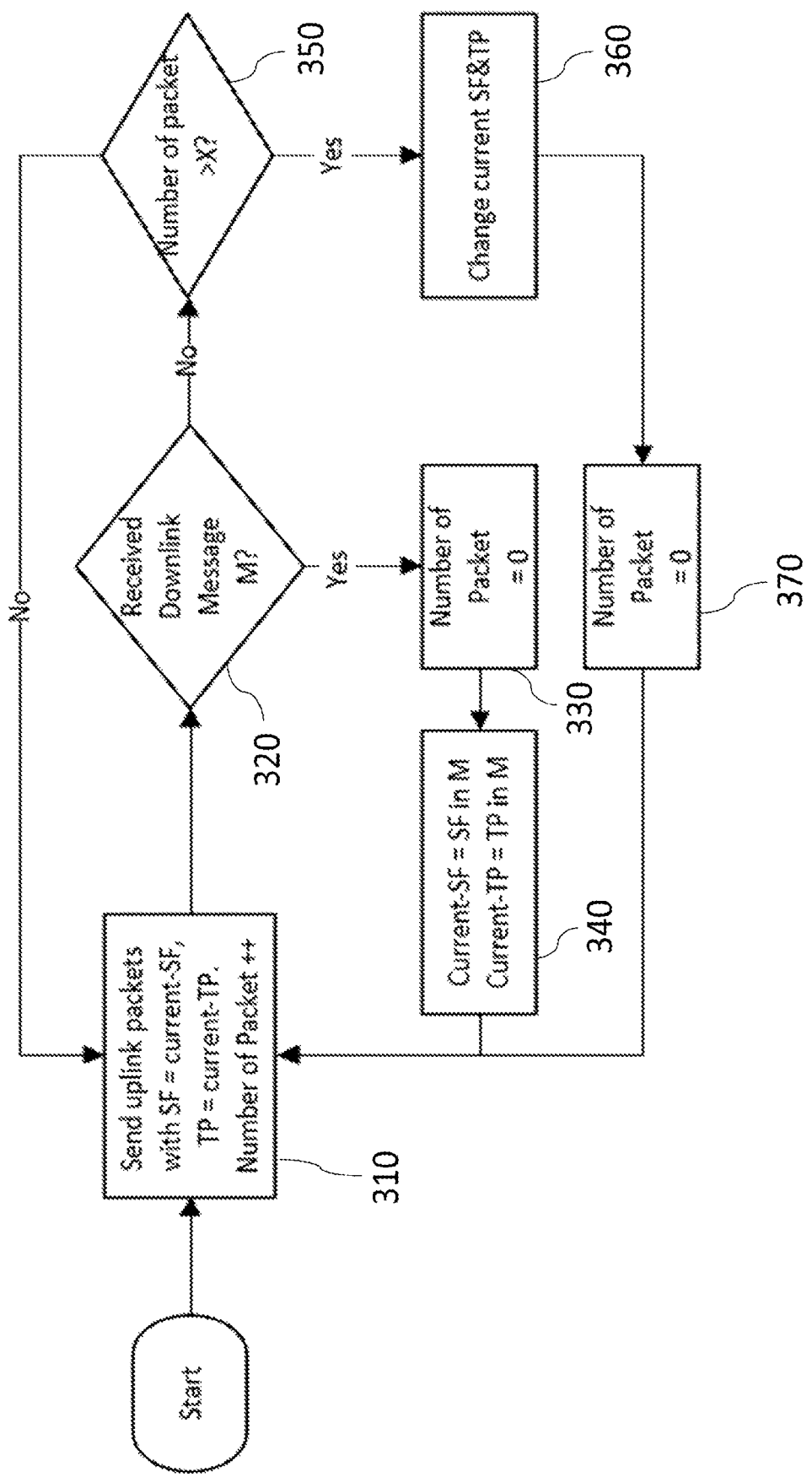
FIG. 4 shows an example ADR mechanism for a wireless node.

FIG. 4 shows an example ADR mechanism for a wireless node. In this method, the link quality of a node is judged based only on reception of downlink acknowledgements from the gateway.

The method starts with the wireless node sending an uplink transmission with a first set of transmission parameters 310. In the present example, the transmission parameters include an initial spreading factor (SF) and an initial transmission power (TP).

The uplink transmission includes one packet. A packet counter is updated to reflect the number of packets transmitted (the packet counter is initialised at zero before the first transmission and is increased by one after the transmission). The wireless node can include the transmission parameters within the transmission (e.g. in a header of the transmission). The gateway (or network server) may also be able to determine some parameters such as SF in the process of decoding the signal. This, in combination with the received signal strength, can enable the gateway (or network server) to determine the correct parameter settings to be used by the wireless node for the transmission.

When the gateway receives a transmission, it may decide to issue an acknowledgement (ACK) to let the wireless node that the transmission was successful. Following the transmission, the wireless node determines whether the downlink acknowledgement is received from the gateway 320. If the acknowledgement is received, then the packet counter is reset to zero 330 and the wireless node moves back to step 310 to send the next transmission using the same set of transmission parameters.

The gateway can sometimes include transmission parameter settings for use by the node within its downlink messages. If an acknowledgement is received, the node determines whether any transmission parameters are included within the downlink message and, if so, the node extracts the parameter settings and sets the transmission parameters accordingly 340.

If the downlink packet that contains data and/or an acknowledgement is not received within a predefined period, then the wireless node determines whether the packet counter is greater than a threshold number (X) of packets 350. If not, then the wireless node goes back to step 310 to send the next transmission (either a transmission of the next packet or a retransmission of the previous packet) using the same transmission parameters. If the packet counter exceeds the threshold, then the wireless node determines that the transmission parameters require updating to ensure successful communication. The transmission parameters are therefore changed 360 (e.g. the transmission power and/or spreading factor are increased).

When updating the transmission parameters, the wireless node increases SF and TP values sequentially, one step at a time (unless these values have already reached their maximum limits). The wireless node then resets the packet counter to zero 370 and then moves back to step 310 to retransmit the packet using the updated transmission parameters.

This form of stepping up of the transmission parameters can take a long time to find effective transmission parameters, as each set of transmission parameters needs to be tested once updated. If the transmission parameters are significantly lower than their required levels then this can lead to a large delay before communication is restored. During this period, a large number of failed transmissions are attempted, thereby expending a large amount of energy before communication is resumed.

Adjusting transmission parameters based only on transmission success is unreliable and causes issues in real-world situations. Due to the channel variation, the resulting received signal strength indicator (RSSI) of the uplink transmissions using fixed transmission parameters will fluctuate. This phenomenon makes it difficult to determine the true link quality based on downlink acknowledgements only.

For instance, a failure of reception of a downlink acknowledgement does not always imply a poor link quality. In certain cases, such as network congestion, uplink packets can be lost even though the wireless node uses the correct transmission parameter values resulting in sufficient link budget. Equally, uplink transmissions may be received occasionally even though an inadequate link budget is used.

This phenomenon means that the link quality is inaccurately judged based solely on transmission success and can cause inaccurate transmission settings to be set, thereby causing lost packets, increased collisions and general power and transmission inefficiencies.

Figure 5:
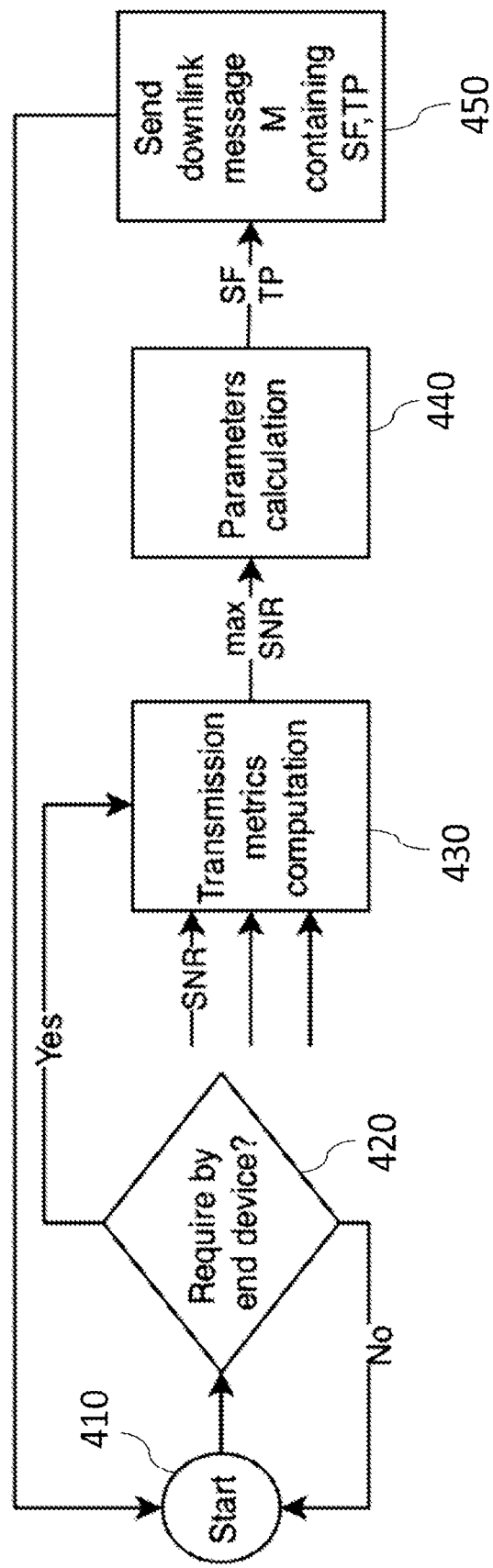
FIG. 5 shows a method for the calculation of transmission parameters on a network side.

FIG. 5 shows a method for the calculation of transmission parameters on the network side. This method is performed either by the gateway, by the network server, or by a combination of both.

When the method starts 410 and the network side determines whether it is required by the node to assess the link quality 420. A wireless node can request at any time the network side to decide its transmission parameters. Such a request is sent in an uplink message, for example by setting a special bit. This might be, for instance, after initial connection with the wireless node and after a predefined number of transmissions have been made (such that the network side has sufficient data to assess the link quality). After such a request, the network side keeps a record of the signal to noise ratio of transmissions received from the nodes in the network.

If it is required to assess link quality, then the network side determines transmission metrics for the node 430. The transmission metrics are based on historical signal to noise ratio measurement for transmissions by the node. The maximum signal to noise ratio is calculated and used to calculate updated transmission parameters for the node 440. These are then communicated to the node in a downlink message M 450. The node extracts the parameters from the downlink message M and applies these in future transmissions.

Assessing updated transmission parameters based solely on maximum signal to noise ratio does not accurately reflect the link quality, as intermittent spikes in signal strength can cause inaccurate link quality judgements thereby resulting in inaccurate transmission parameter calculations. Furthermore, the network side only performs ADR when this is requested by the node. As the node does not have knowledge of the transmissions across the network, it is not best placed to make this decision.

In light of the above, embodiments described herein make use of an improved link quality assessment mechanism that makes use of the network side to continually assess link quality centrally using improved signal quality metrics and update the required transmission parameters for each wireless node in the network when link quality drops below a threshold.

Improved Network-Side ADR Mechanism

As discussed above, the network side (the gateway and/or network server) monitors the transmissions from the nodes in the network and sends instructions to the nodes to update their transmission parameters based on its assessment of link quality.

The proposed functionality provides a more accurate evaluation and estimation of the true link quality by considering multiple communication metrics:

Frame loss (e.g. frame loss ratio)
Signal strength (e.g. average RSSI of collected packets, maximum RSSI of collected packets)
Signal strength variation (e.g. estimated standard deviation (std) of signal strength variation (RSSI))

These metrics are computed on the network side, (e.g. by the gateway or by a system connected to the gateway, such as the network server). These may optionally be sent to the node in downlink acknowledgements. The network can monitor the performance of multiple nodes within the network, sending tailored transmission parameters settings to each based on their respective link quality. For clarity, the below description relates to monitoring by a gateway, but it will be clear that they can be monitored by any form of computing system (e.g. a system that either receives transmission metric measurements from the gateway or receives the transmission itself, such as a general wireless device).

Figure 6:
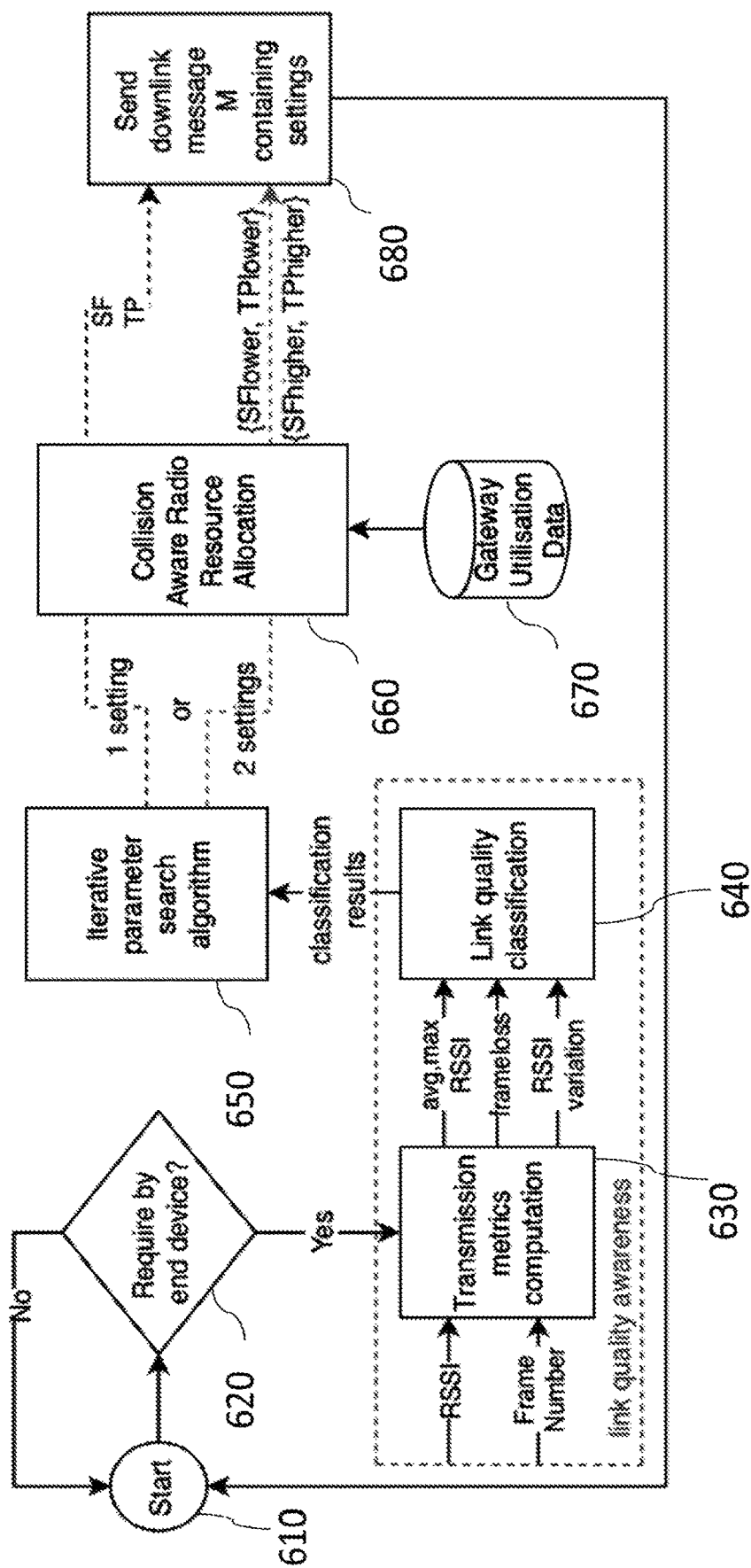
FIG. 6 shows a method of for the calculation of transmission parameters by a gateway according to an embodiment.

FIG. 6 shows a method of for the calculation of transmission parameters by a gateway according to an embodiment. The method implements multiple improvements over prior ADR systems, including an improved link quality awareness mechanism and an iterative parameter search mechanism (the latter of which will be discussed later in more detail). In short, the iterative parameter search method allows a node to transmit multiple transmissions at different transmission settings (e.g. a higher and a lower set of transmission parameters). The gateway can then determine which of these settings to utilise and/or how best to adjust the transmission parameters based on the link quality metrics determined for each transmission.

The method begins at step 610 and the gateway determines whether it is needed by a node to calculate transmission parameters 620. This would be the case if the wireless node has already requested the networks side by sending a special uplink message. Generally, the next step includes determining whether a sufficient number of measurements have been recorded for a communication link to enable link quality to be accurately assessed.

The gateway collects the RSSI and frame number information of received uplink packets between each node and the gateway. The network will look at the frame number (counter) value of collected packets of each node. If it finds that a node has sent over a certain number of packets (e.g. 20), it will derive the above communication metrics 630 based on the collected information of past received uplink packets.

The transmission metrics are calculated based on the number of frames received and the signal strength (e.g. RSSI). The transmission metrics include the average and maximum signal strength (e.g. RSSI), frame loss and signal strength variation (e.g. RSSI variation). The gateway then evaluates the level of link quality (link quality classification) 640 based on the metrics.

The classification results are then utilised in an iterative parameter search method 650 to determine a link budget level. The iterative parameter search method shall be discussed in more detail below. Either one link budget, or multiple (e.g. two) link budgets are output, depending on whether the outcome of the iterative parameter search method in step 650. These link budgets are passed on to collision aware radio resource allocation module that makes use of gateway utilisation data 670 to determine the transmission parameters (e.g. SF and TP) based on the link budget. The determined transmission parameter settings are then transmitted to the node in a downlink message M 680. The method then loops back to the start 610.

It is worth noting that if the transmission parameters (e.g. SF or TP) have changed during the process, the mechanism will discard the collected information for the previous transmission parameters and restart the process (that is, the method resets the frame counter and the measured information).

For probing transmissions using multiple (e.g. two) sets of transmission parameters iteratively, the mechanism will be applied separately for uplink packets using different transmission parameter settings (e.g. SFlower and TPlower, SFhigher and TPhigher). In other words, for two settings there will be four metrics (maximum RSSI, average RSSI, frame loss ratio and RSSI variation) for one setting and another four metrics for the other setting; therefore leading to two classification results.

Link Quality Classification

The aim of link quality classification is to estimate link quality based on the level of link budget of the transmission. A link budget is an accounting of all of the gains and losses from the transmitter. For instance, a link budget may be:

$$P_{received} = P_{transmitted} + \text{Gains} - \text{Losses}$$

Transmission parameters (e.g. SF and TP) directly impact the link budget as they affect the power transmitted ($P_{transmitted}$) and losses. Equally, received signal strength (e.g. RSSI, the received signal strength indication) directly reflects the level of the link budget as it reflects the power received ($P_{received}$).

Figure 7:
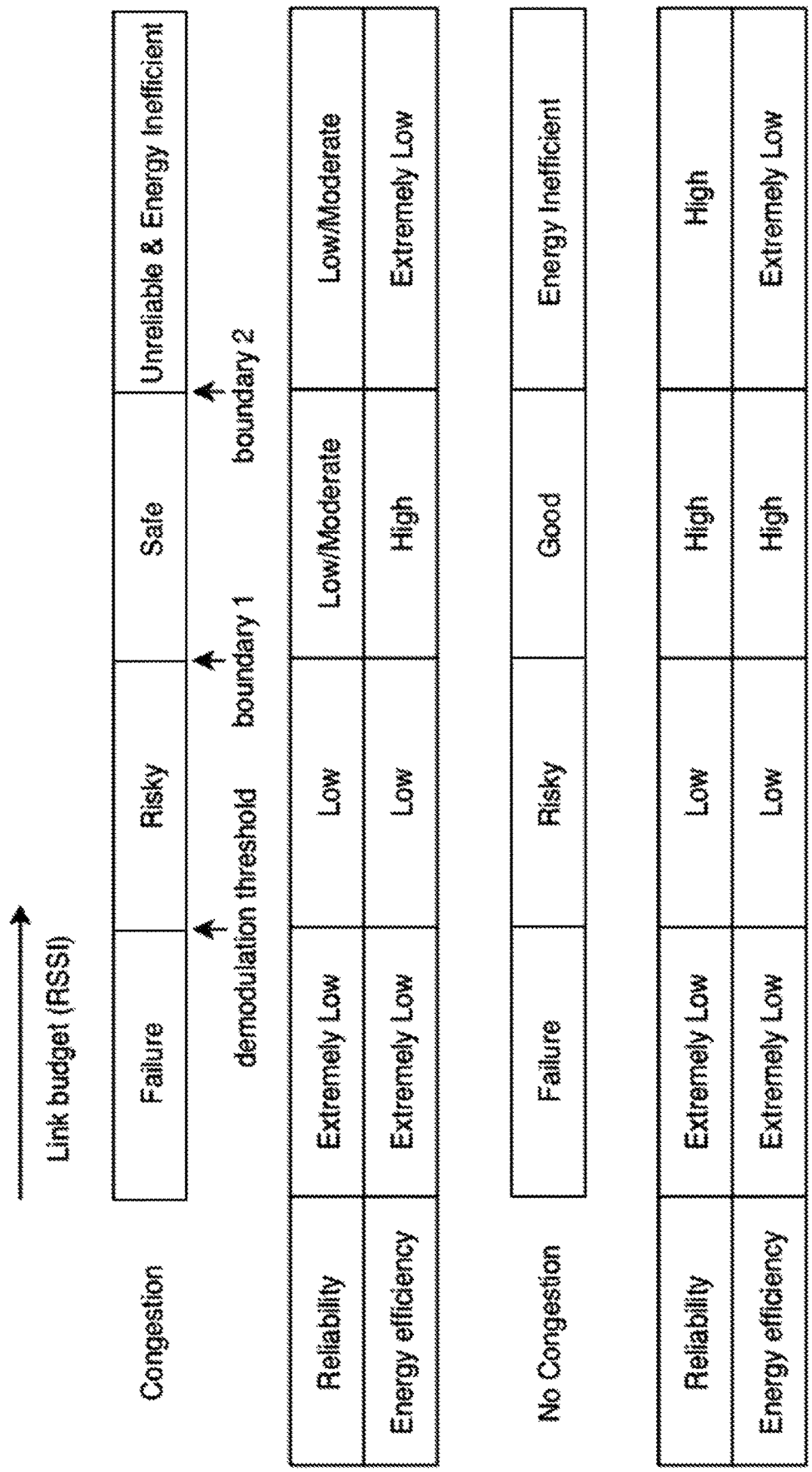
FIG. 7 shows link quality classifications for various levels of performance according to an embodiment.

FIG. 7 shows link quality classifications for various levels of performance according to an embodiment. The relative reliability and energy efficiency are shown for each classification. The link performance in terms of reliability and energy efficiency is affected not only by the link budget (e.g. the RSSI detected) but also by the relative amount of congestion within the network.

Link budget is divided into different link performance regions in ascending order as follows:

- Failure (not used in classification): This region means that the level of link budget associated with current values of SF and TP results in a received signal strength that is below the demodulation threshold (the minimum detectable signal strength) of the gateway. This is characterised by extremely low reliability and also energy efficiency. The gateway is unable to receive the uplink packets with current settings in this region. It is not possible to gather information to make intelligent decisions because most packets are lost because of the RSSI being below the demodulation threshold.
- Risky: The level of link budget results in RSSI being above but still very close to the demodulation threshold. This is characterised by low reliability and energy efficiency. The gateway can sometimes receive the uplink messages but also sometimes not due to signal variation causing high frame loss ratio. This region is likely to be characterised by high frame loss ratio.
- Good: The level of link budget results in RSSI that is sufficiently higher than the demodulation threshold. This is characterised by high reliability and high energy efficiency. The gateway is able to receive the uplink messages with a small frame loss, especially when there is no congestion on the channel (e.g. using the current SF and frequency channel).
- Safe: This region has the same level boundaries as the 'Good' region but it suffers from high to moderate frame losses due to the congestion on current channel. This is characterised by low to moderate reliability and high energy efficiency. Accordingly, even though the link budget level is in desirable range, there is no guarantee that reliable uplink transmissions can be achieved.
- Energy Inefficient: The level of link budget results in RSSI that far exceeds the demodulation threshold. This is characterised by high reliability and extremely low energy efficiency. The uplink messages are seldom lost; however, in this region the end device may consume a large amount of energy, e.g. through a high SF (long packet on air time) or a high TP. It would therefore be recommended to reduce the link budget to conserve energy.
- Unreliable & Energy Inefficient: This region has the same level boundaries as the 'Energy inefficient' region; however, due to the congested network, collision between uplink messages is frequent and thus the gateway still suffers a high frame loss ratio. This is characterised by low to moderate reliability and extremely low energy efficiency.

From FIG. 7 it is clear that by using the packet reliability and RSSI boundary information, the RSSI measurements can be distinguished into link performance classifications. The reliability is directly related to the frame loss ratio. While the RSSI boundary is related to the signal strength of the received packets and the demodulation threshold of the gateway. Higher variation in signal strength often causes high levels of packet losses. Therefore, the link budget (transmission parameters) need to be increased to a larger degree to fall in 'Safe' and 'Good' region. Accordingly, embodiments described herein make use of the signal strength variation when calculating the boundaries for the link quality estimation.

The estimated standard deviation (std) of RSSI is used to measure the signal strength variation. The demodulation threshold comes from hardware specifications and is a measure of gateway's sensitivity to successfully demodulate the weakest signal transmitted using a given SF.

Figure 8:
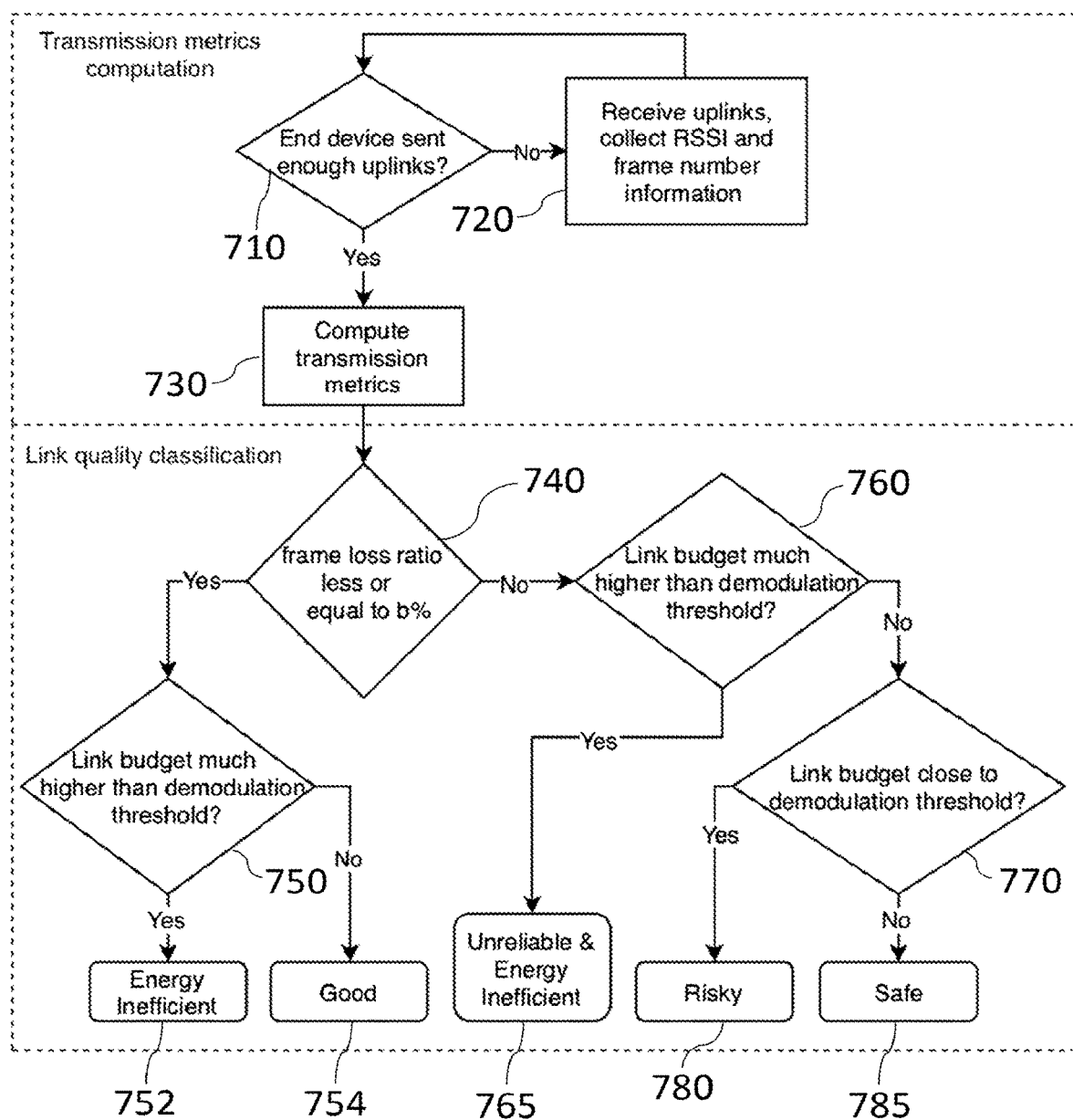
FIG. 8 shows a method for determining link quality classes in accordance with an embodiment.

FIG. 8 shows a method for determining link quality classes in accordance with an embodiment. This is equivalent to the transmission metrics computation 630 and link quality classification 640 steps of FIG. 6.

During transmission metrics computation, the method determines whether a sufficient number (a predefined amount) of uplink transmissions have been detected from the node for the node's current transmission settings. If not, then the method continues to collect uplink transmissions, determining the signal strength (e.g. RSSI) and frame number for each uplink transmission 720. Once a sufficient number of transmissions have been detected, the method computes the transmission metrics 730, as described above, before moving to link quality classification.

During link quality classification, the method determines 740 whether the frame loss ratio is less than or equal to a threshold frame loss ratio (b). If so, then the link reliability is deemed to be high. The threshold frame loss ratio is a configurable variable expressed in a percentage.

If the frame loss ratio is above the threshold, then the current selection of transmission parameters either put the link in the 'Good' or 'Energy Inefficient' regions. To determine which region applies, the method determines 750 whether the link budget is higher than a first boundary. This checks whether the RSSI is much higher than the minimum RSSI (e.g. the demodulation threshold).

Whilst a variety of boundaries may be utilized depending on the metrics and transmission parameters used, in the present embodiment the first boundary provides a threshold for each of the average RSSI (avgRSSI) and the maximum RSSI (maxRSSI):

$$avgRSSI > RSSI_{min} \times x \times std$$

$$maxRSSI > RSSI_{min} + y \times std$$

where $RSSI_{min}$ is a threshold for the minimum RSSI (e.g. the demodulation threshold), std is the standard deviation of the variation in RSSI and x and y are tuneable parameters, wherein x<y. If both thresholds are satisfied then the link budget is deemed to be higher than the first boundary. Alternatively, a more conservative approach may be applied where the link budget is deemed to be higher than the first boundary if at least one of the above thresholds is satisfied.

The signal strength information (e.g. RSSI) is compared with the first boundary. If the link budget is higher than the first boundary then the link quality is classified as 'Energy Inefficient' 752. If the link budget is not higher than the first threshold, then the link quality is classified as 'Good' 754.

Returning to step 740, if the frame loss ratio is greater than the threshold frame loss ratio (b), then the link reliability is low or moderate. Therefore, the current transmission parameters will fall among one of the 'Risky', 'Safe' and 'Unreliable & Energy Inefficient' classifications. In this case, the method checks whether the link budget is higher than the first boundary 760. This is the same test as step 750.

If the link budget is higher than the first boundary, then the link quality is classified as 'Unreliable & Energy Inefficient' 765. This is because the current link budget (e.g. current SF and TP) results in an RSSI that far exceeds the minimum RSSI (e.g. the demodulation threshold) but still leads to a high frame loss ratio.

If the first boundary is not exceeded in step 760, then the method determines 770 if the link budget results in an RSSI that is close to the minimum RSSI (e.g. the demodulation threshold). This is achieved by checking whether the link budget is lower than a second boundary (that is lower than the first boundary).

Whilst a variety of boundaries may be utilized, depending on the metrics and transmission parameters used, in the present embodiment the second boundary provides a threshold for each of the average RSSI (avgRSSI) and the maximum RSSI (maxRSSI):

$$\text{avgRSSI} < \text{RSSI}_{min} + n \times std$$

$$\text{maxRSSI} < \text{RSSI}_{min} + m \times std$$

where $\text{RSSI}_{min}$ is a threshold for the minimum RSSI (e.g. the demodulation threshold), std is the standard deviation of the variation in RSSI and n and m are tuneable parameters, wherein $n < m$. Furthermore, $n < x$ and $m < y$. If both thresholds are satisfied then the link budget is deemed to be lower than the second boundary. Alternatively, a more conservative approach may be applied where the link budget is deemed to be lower than the second boundary if at least one of the above thresholds is satisfied.

If the link budget is found to be lower than the second boundary, then the link quality is classified as 'Risky' 780 since the current RSSI is close to the minimum RSSI (e.g. the demodulation threshold) and leads to a high frame loss ratio. If the link budget is greater than or equal to the second boundary (i.e. if both of the conditions above with regard to the second boundary are not satisfied), then the link quality is classified as 'Safe' 785.

---

Algorithm 1 Link quality classification for uplink transmission using parameter setting SF and TP

---

1: Input:b, x, y, m, n are configurable constants where $n < m < x < y$, b's unit, is percentage
2: threshold ← gateway sensitivity
3: std ← standard deviation of signal strength variation
4: if frame loss <= b(%) then
5:   if avgRSSI > threshold + x * std AND maxRSSI > threshold + y * std then
6:     region ← " Energy Inefficient"
7:   else
8:     region ← " Good"
9: else
10:   if avgRSSI > threshold + x * std AND maxRSSI > threshold + y * std then
11:     region ←" Unreliable & Energy Inefficient"
12:     else if avgRSSI < threshold+n*std AND maxRSSI < threshold+m*std then
13:       region ← " Risky"
14:     else
15:       region ← " Safe"

---

It should be noted that the order of steps 740 and 750/760 may be swapped, provided that the same checks are eventually performed to reach the required classifications.

Pseudocode of the link quality classification method is shown above (Algorithm 1).

Parameters Probing and Searching for Agile Link Quality Adaptation

Current ADR methods on the node side aim to increase link budget when the node decides that the link quality is not good enough. The link quality is improved by simply increasing link budget step by step until some responses are detected from the gateway. This can take a long time to converge on an acceptable set of transmission parameters.

To speed up the parameter searching process and reduce the delay before communication is resumed, embodiments described herein provide a parameter probing mechanism that sends multiple transmissions per probing attempt (rather than a single transmission). The probing transmissions have different transmission parameters. This allows the gateway to judge from a selection of transmission settings at each iteration.

Accordingly, the method can converge on an effective set of transmission parameters more quickly. This can also result in an effective set of transmission parameters being reached through fewer rounds of probing, thereby increasing the energy efficiency by reducing the overall number of transmissions required to settle on an acceptable set of transmission parameters.

The probing can be triggered either if the end device does not receive a signal from the gateway for certain period of time. Alternatively, or in addition, the probing can be triggered by the network side. This can be through a command to begin probing (680 in FIG. 6). The probing can include defined sets of transmission parameters for use in the probing (e.g. the gateway can suggest multiple levels for SF and/or TP).

The present embodiment shall be described using two sets of transmission parameters (higher and lower parameters); however, any number of sets of transmission parameters may be utilised. Increasing the number of sets of transmission parameters beyond two can lead to an effective set of parameters more quickly; however, each round of probing uses more energy and takes up a greater amount of channel time.

Figure 9:
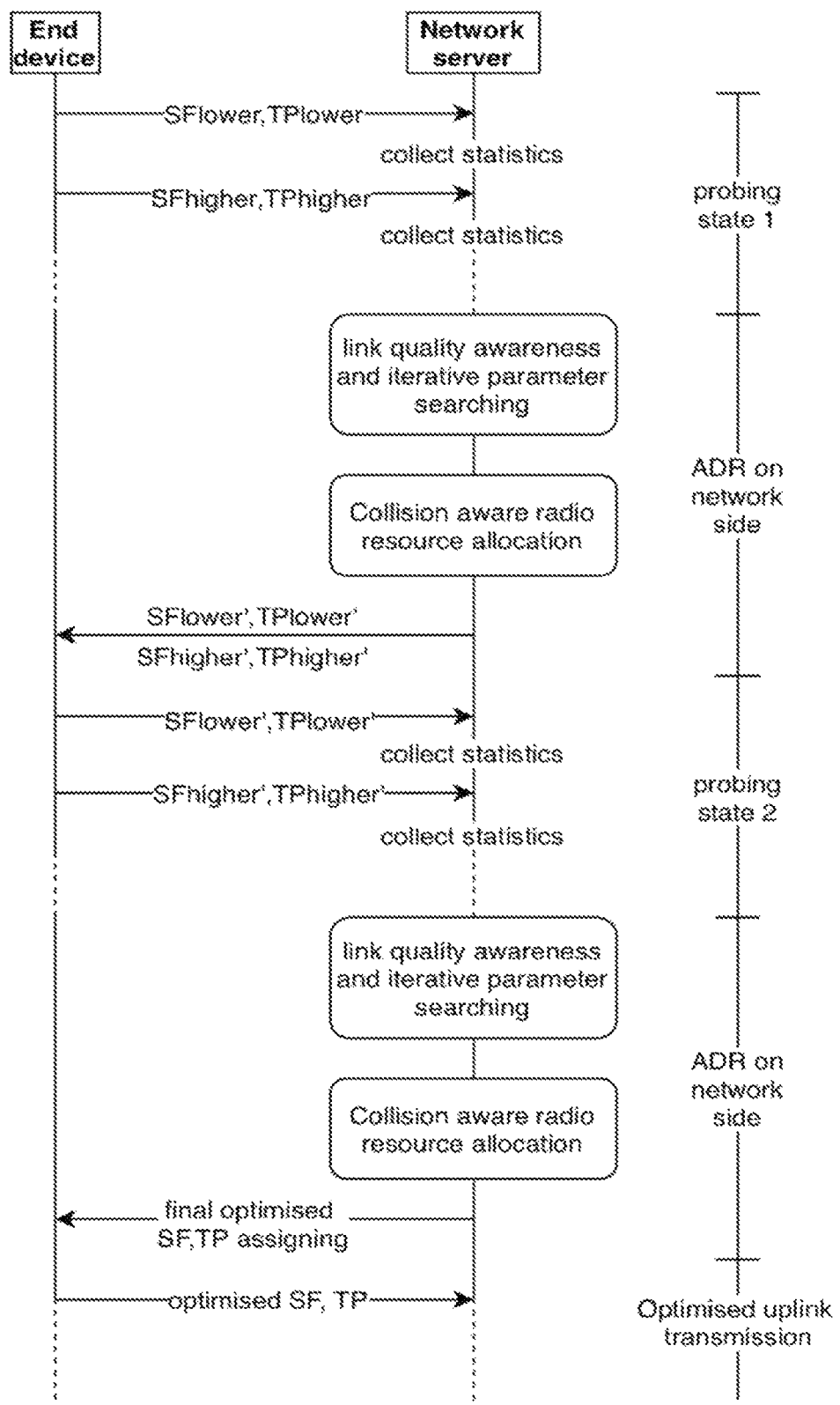
FIG. 9 shows an example of a method for iteratively probing for optimum transmission parameters according to an embodiment.

FIG. 9 shows an example of method for iteratively probing for optimum transmission parameters according to an embodiment.

The probing is triggered if the node (the end device) realises that the current link quality is inadequate (e.g. it does not receive any transmissions from gateway for a certain period), or if the node receives an instruction to begin probing from the gateway (the network server).

The node sends two transmissions, one with higher transmission settings (SFhigher and TPhigher in the present embodiment) and one with lower transmission settings (SFlower and TPlower in the present embodiment). The higher transmission settings have a higher link budget than the lower transmission settings.

The link budget and/or transmission parameters (SF and TP values) may be determined by the node or may be suggested by the gateway in a downlink communication that instructs the start of the probing.

The gateway then classifies the link quality of each received transmission and selects an updated set of transmission parameters based on the link quality metrics. The gateway may be able to select an effective set of transmission parameters from the first round of probing, so may only transmit a final set of transmission parameters (e.g. one SF setting and one TP setting). The method of classifying link quality and selecting transmission parameters is discussed above.

Having said this, it is possible that further rounds of probing will be required before the gateway can settle on a final set of transmission parameters. In this case (as shown in FIG. 9), the gateway selects updated higher and lower sets of transmission parameters ({SFlower', TPlower'} and {SFhigher', TPhigher'}) with updated higher and lower link budgets.

These updated settings are transmitted to the node, which implements them in the next transmission(s). In the scenario shown in FIG. 9, two rounds of probing are required before the gateway is able to settle on final optimised transmission parameters that are then utilised by the node in future transmissions.

Figure 10:
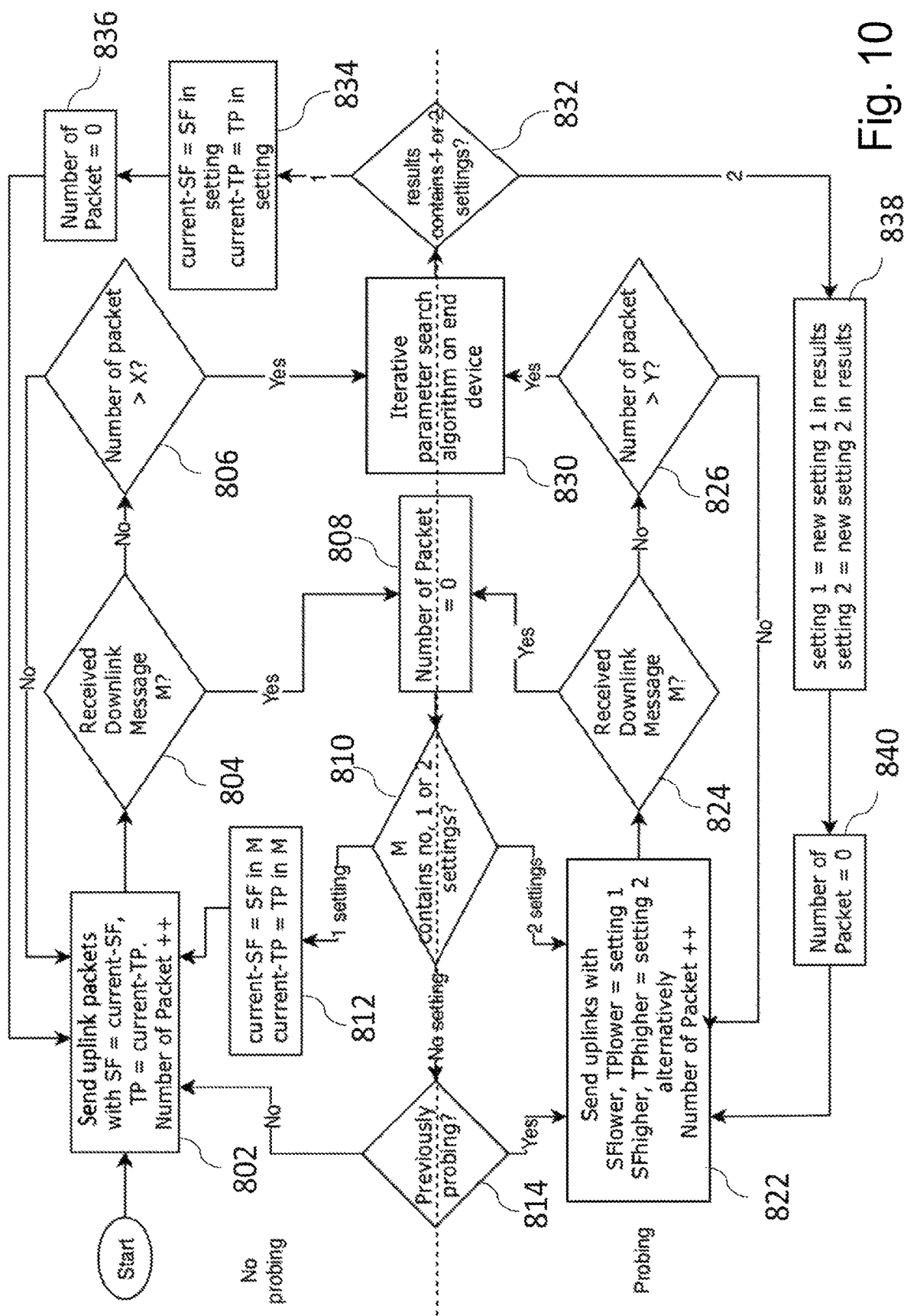
FIG. 10 shows an example of a method of for the calculation of transmission parameters by a node according to an embodiment.

FIG. 10 shows an example of a method of for the calculation of transmission parameters by a node according to an embodiment. This is similar to that shown in FIG. 4; however, this method takes into account the potential for multiple probing transmissions to be sent in each iteration.

The flow chart of FIG. 10 is divided into two phases, a non-probing phase where the node is not implementing probing, and a probing phase where probing is being implemented.

The method starts with the node operating in the non-probing phase. This is the default phase for when the node considers the current link budget to be appropriate. This phase is similar to the start of the method of FIG. 4 in that an uplink transmission is sent 802 using current transmission parameters (current-SF and current-TP), a packet counter is updated, and the node determines whether a downlink message is received from the gateway 804. If not, then it is determined 806 whether the counter exceeds a first packet threshold, X. If not, then another transmission attempt is made using the same transmission parameters 802.

If a downlink message is received, then the packet counter is reset to zero 808 and the node determines how many sets of transmission parameters (how many transmission parameter settings) are included in the downlink message 810. If one set of parameters is included (e.g. one SF and one TP), then the node determines that it is to continue within the non-probing phase. The current transmission parameters are updated to the values in the downlink message 812 and these new parameters are used in the next uplink message 802.

If more than one set of transmission parameters is included in the downlink message, then the node determines that the gateway is instructing it to perform probing using these settings. The node therefore moves into the probing phase to send probing transmissions. In the present case, two probing settings are utilised, a higher setting (SFhigher, TPhigher) and a lower setting (SFlower, TPlower), although more settings may be used.

If no settings are included in the downlink message, then the node determines whether it was previously probing (was previously operating in the non-probing or probing phases of the method) 814. If not, then the node moves back to step 802 to send another uplink message using the previous transmission settings. If the node was previously probing, then the node stays in the probing phase and sends more probing transmissions 822.

In the probing phase, the node sends two uplink transmissions, each utilising a corresponding set of transmission parameters, and the packet counter is increased 822.

Similar to the non-probing phase, the node determines whether a downlink response is received 824 and, if so, the node moves to steps 808 and 810 to reset the packet counter and determine how many (if any) sets of transmission parameters are included in the downlink message. If no downlink message is received, the node determines 826 whether the packet counter exceeds a second packet threshold, Y (that may be different to the first threshold). If not, then the method loops back to step 822 to transmit another set of probing transmissions using the current sets of transmission parameters.

If, in either of the probing or non-probing phases, the corresponding packet threshold (X or Y) is found to have been exceeded (i.e. if the first packet threshold, X, is exceeded in step 806 or the second packet threshold, Y, is exceeded in step 826), then the node implements the iterative parameter search algorithm 830 to determine updated transmission parameter setting(s). This is because the node has lost connection with the gateway and therefore cannot receive new parameter settings from the gateway and must determine them itself.

The iterative parameter searching method is detailed below. It can result in either one set of transmission parameters, or multiple (e.g. two) sets of transmission parameters. In the present example, a maximum of two sets of transmission parameters (higher and lower) are determined.

The node determines whether one or multiple (two) sets of settings have been determined 832. If one set of transmission parameters is determined, then the node moves into the non-probing phase by setting the current transmission parameters to equal the determined parameters 834, resetting the packet counter to zero 836 and moving to step 802 to send a new transmission with the updated parameters. It two sets of parameters have been determined, then then the two settings are adopted 838, the packet counter is reset 840 and the method moves into the probing phase by moving to step 822 to send new messages with the new sets of transmission parameters.

The benefit of the present probing approach is that when link quality is insufficient, instead of searching optimal settings step by step as in previous methods, probing transmissions are capable of creating a wider search area in terms of link budget using only a few (e.g. two) different transmission parameters (e.g. SF and TP settings) in one probing state attempt. This significantly improves the efficiency to reach the optimal transmission parameters.

The iterative parameter search method derives the transmission parameters used in each probing state until optimal transmission parameters (SF and TP values) are found.

Table 1 shows the potential combinations of transmission power (measured in dBm) and spreading factor available in the present embodiment. Naturally, these are examples of potential parameters, and alternative parameters and alternative values may be utilized.

TABLE 1

Potential combinations of SF and TP.

| {TP, SF} | SF = 7 | SF = 8 | SF = 9 | SF = 10 | SF = 11 | SF = 12 |
|---|---|---|---|---|---|---|
| TP = 2 | 2, 7 | 2, 8 | 2, 9 | 2, 10 | 2, 11 | 2, 12 |
| TP = 5 | 5, 7 | 5, 8 | 5, 9 | 5, 10 | 5, 11 | 5, 12 |
| TP = 8 | 8, 7 | 8, 8 | 8, 9 | 8, 10 | 8, 11 | 8, 12 |
| TP = 11 | 11, 7 | 11, 8 | 11, 9 | 11, 10 | 11, 11 | 11, 12 |
| TP = 14 | 14, 7 | 14, 8 | 14, 9 | 14, 10 | 14, 11 | 14, 12 |

When processing this method, the gateway determines transmission parameter setting(s) falling within certain link budgets that provide good link reliability and energy efficiency. Multiple sets of potential transmission parameter settings can be categorized into distinct classes that result in similar link budgets. We call these classes link budget level. Table 2 shows one possible classification of parameter settings into ten link budget levels. Different settings within the same link budget level have a similar ability to reach the gateway. Nevertheless, the energy consumption associated with them can be different.

In one embodiment, method utilizes a constant SF and only varies TP with link budget (for instance, taking one of the columns in Table 1, e.g. the first column). Alternatively, a constant TP may be utilized, with SF increasing with link budget (e.g. one of the rows in Table 1). Having said this, various embodiments make use of link budgets that include various options for transmission parameters. The following description relates to these latter embodiments. The selection of the transmission parameters can make use of collision aware radio resource allocation module, as described below. Having said this, it will be appreciated that the methods described herein can equally be applied with only a single available set of transmission parameters per link budget level.

Table 2 shows example sets of transmission parameters resulting in various link budget levels (or classes). The energy expenditure increases with each link budget level, along with increasing the received signal strength at the receiver (thereby increasing the chance of successful transmission).

TABLE 2

Potential combinations of SF and TP for various link budget levels/classes.

|  | {TP, SF} | {TP, SF} | {TP, SF} | {TP, SF} | {TP, SF} |
|---|---|---|---|---|---|
| Link Budget Level 1 | 2, 7 | | | | |
| Link Budget Level 2 | 5, 7 | 2, 8 | | | |
| Link Budget Level 3 | 8, 7 | 5, 8 | 2, 9 | | |
| Link Budget Level 4 | 11, 7 | 8, 8 | 5, 9 | 2, 10 | |
| Link Budget Level 5 | 14, 7 | 11, 8 | 8, 9 | 5, 10 | 2, 11 |
| Link Budget Level 6 | 14, 8 | 11, 9 | 8, 10 | 5, 11 | 2, 12 |
| Link Budget Level 7 | 14, 9 | 11, 10 | 8, 11 | 5, 12 | |
| Link Budget Level 8 | 14, 10 | 11, 11 | 8, 12 | | |
| Link Budget Level 9 | 14, 11 | 11, 12 | | | |
| Link Budget Level 10 | 14, 12 | | | | |

There are multiple ways to increase the link budget: a) increase SF; b) increase TP; or c) increase both SF and TP. Usually, increasing the SF by 1 gives a similar level of improvement in link budget as a 3 dBm increase in TP. Therefore, multiple classes from different combinations of SF and TP values will lead to similar link budgets and thus can be categorized together.

The iterative parameter search method increases the link budget level when transmission performance drops below a threshold.

The iterative parameter search algorithm determines a link budget level for each proposed set of transmission parameters (e.g. higher and lower link budget levels where two transmission parameter settings are being applied during probing).

The link budget level(s) are then translated into their corresponding transmission parameters (SF and TP values). On the network side this may make use of the gateway's knowledge of the transmissions from various nodes within the network and, in particular, the channel (e.g. the spreading factor) being used by each node.

The gateway can therefore assign transmission parameters by first selecting the spreading factor that would cause the highest probability of successful transmission (based on the spreading factors being used by other nodes in the network), and then assign the transmission power that would fit the selected link budget given the chosen spreading factor (the collision aware radio resource allocation step shown in FIG. 6).

On the node side, the parameters with the lowest packet on air time (the lowest SF value) from those that fall within the determined link budget may be chosen.

The iterative parameter search method can be divided into two parts: on the end device side and on the network side.

Iterative Parameter Search Algorithm—End Device Side

The node (the end device) generally implements transmission parameter settings that are sent to it by the gateway. Having said this, if the node loses contact with the gateway, it is able to determine its own settings utilising a node-side iterative parameter search mechanism.

Figure 11:
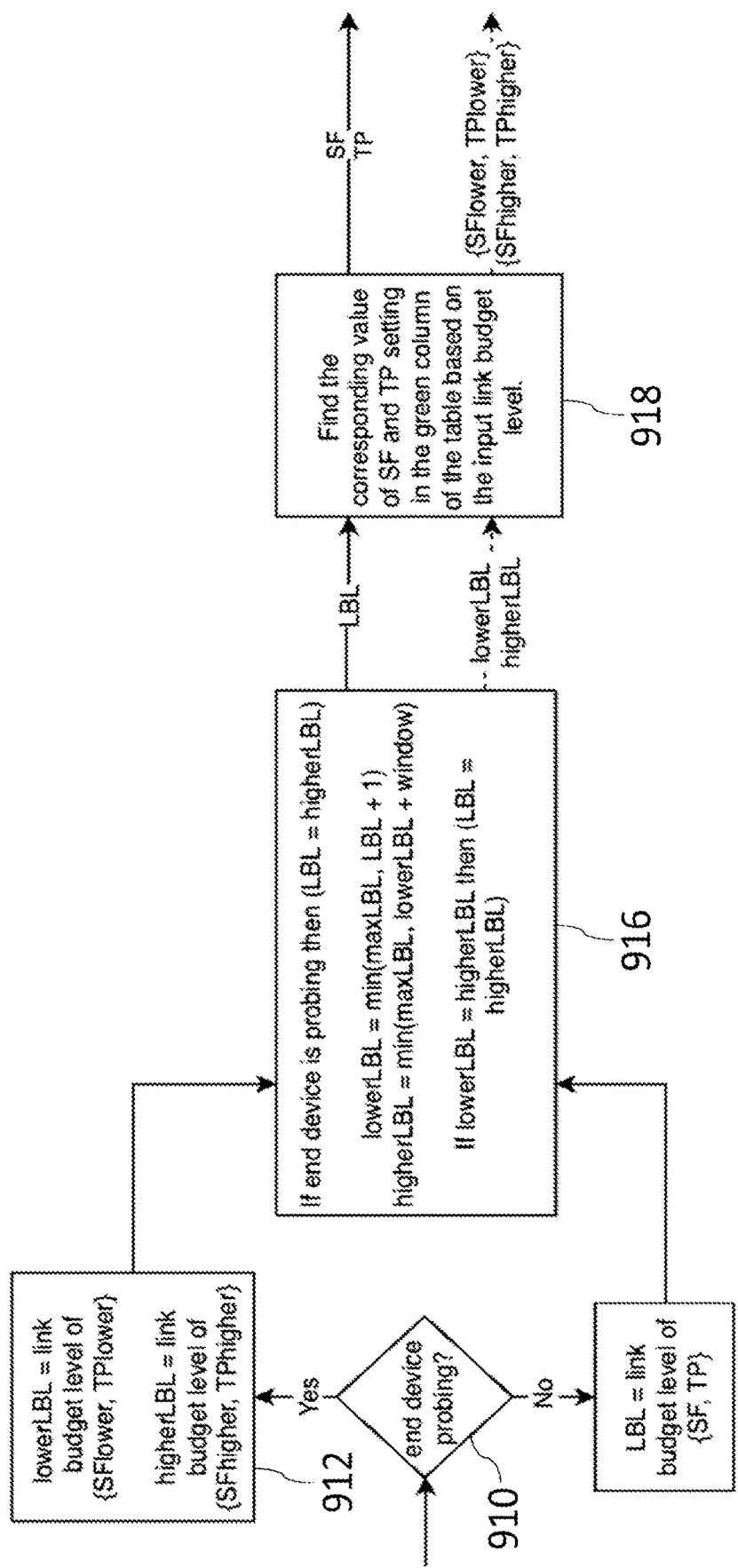
FIG. 11 shows a method for selecting a link budget level on a node (end device) according to an embodiment.

FIG. 11 shows a method for selecting a link budget level on a node (end device) according to an embodiment. This forms the iterative parameter search algorithm for the end device.

This method is implemented by the end device when it does not receive any downlink transmissions from the gateway (e.g. within a predefined period of time) in response to certain uplink transmissions. If this happens then the end device assumes that the link quality is inadequate and implements the iterative parameter search algorithm to find the parameter settings for use in the next probing state. The node will first convert the currently used SF and TP setting(s) into their corresponding link budget level(s).

The node determines 910 whether it is currently probing (and therefore has been already using multiple link budget levels) or whether it is not currently probing (and therefore has only used a single link budget level in the previous transmission). Either way, the method will determine multiple link budget levels, but the method of determining these levels will depend on whether multiple link budget levels have been used in the previous round of transmissions.

If the device is probing, then the lower link budget is determined to be the link budget level of the current lower transmission parameters (in this case, SFlower and TPlower) and the higher link budget level is determined to be the link budget level of the current higher transmission parameters (in this case, SFhigher and TPhigher) 912. If the device is not probing, then the current link budget level is determined to be the link budget level of the current set of transmission parameters (in this case, SF and TP) 914.

As the method is triggered by a determination that the current link quality is too low, the node then determines new link budget levels 916 that are higher than the current link budget level(s) (unless a maximum link budget level has been reached).

In the present embodiment, the link budget level(s) are increased by proposing two new values of link budget levels separately: a lower link budget level (lowerLBL) and a higher link budget level (higherLBL). This is achieved by choosing two link budget levels that are higher than the previous link budget level(s) but not exceeding a maximum allowed level. The two new link budget levels are separated by a window size (a number of link budget levels), if possible. The lowest link budget level proposed is higher than the highest previously used link budget level by a step size (in this case, 1), unless the maximum link budget level has been reached. If the maximum link budget level means that only a single possible new link budget level is available, then only this one link budget level is proposed.

The window size, step size and maximum link budget level are configurable (e.g. predefined). In the present embodiment, the maximum possible link budget level (maxLBL) is 10 (as shown in Table 2).

Specifically, the new lower link budget level is determined by adding the step size onto the highest previous link budget level (i.e. the previous higher link budget level where probing was previously used or the link budget level where no probing was previously used). The result of this addition is set to the new lower link budget level unless it exceeds the maximum link budget level, in which case the new lower link budget level is set to the maximum link budget level.

The new higher link budget level is determined by adding the window size onto the new lower link budget level. The result of this addition is set to the new higher link budget level unless it exceeds the maximum link budget level, in which case the new higher link budget level is set to the maximum link budget level.

In the case where both link budget levels of probing settings are equal and there is no more space available to increase, the algorithm will generate a single link budget level (LBL) which is equal to both link budget levels of probing setting ('Link budget 10').

Consider an example in which an end device is currently using SF=7 and TP=5. The corresponding link budget level is therefore 'Link budget 2' (according to Table 2). The window size is 2 and the step size is 1. The resulting link budget level for the new probing settings will be therefore 'lowerLBL=3' and 'higherLBL=5'.

The transmission parameter setting(s) for each of the new link budget level(s) are then determined 918. In this case, higher and lower values for the transmission parameters are determined unless a single link budget level has been proposed, in which case a single set of transmission parameters is determined.

Since the collision aware radio resource allocation is not available on the node side (as it does not have access to the performance metrics for other nodes in the network), the node has to decide the resulting SF and TP settings itself. This can be achieved by choosing the SF and TP value(s) in the first column in Table 2 corresponding to the selected link budget level(s). The SF and TP settings in this column have the shortest packet on air time among all possible settings in the same link budget level (as they have the lowest available SF value for the link budget level).

High packet on air time is likely to result in high channel occupancy time. Thus, choosing the settings with shortest packet on air time is the best choice when global information (about each node in the network) is not available. For example, if the link budget level lowerLBL' is 3, then {SFlower, TPlower} should be {7, 8} corresponding to the settings in Table 2.

A transmission is then sent to the gateway for each determined set of transmission parameters (each determined link budget). Each transmission implements the corresponding set of transmission parameters to allow the gateway to measure the performance of each set of transmission parameters.

Iterative Parameter Search Algorithm—Network Side

As discussed above with respect to FIG. 6, the gateway monitors the link quality and instructs changes to the transmission parameters when the link quality falls outside of an optimum range (i.e. the link quality is too low or too high). The gateway first determines updated link budget(s) (the iterative parameter search algorithm 650) before determining the corresponding set(s) of transmission parameters (the collision aware radio resource allocation 660).

Figure 12:
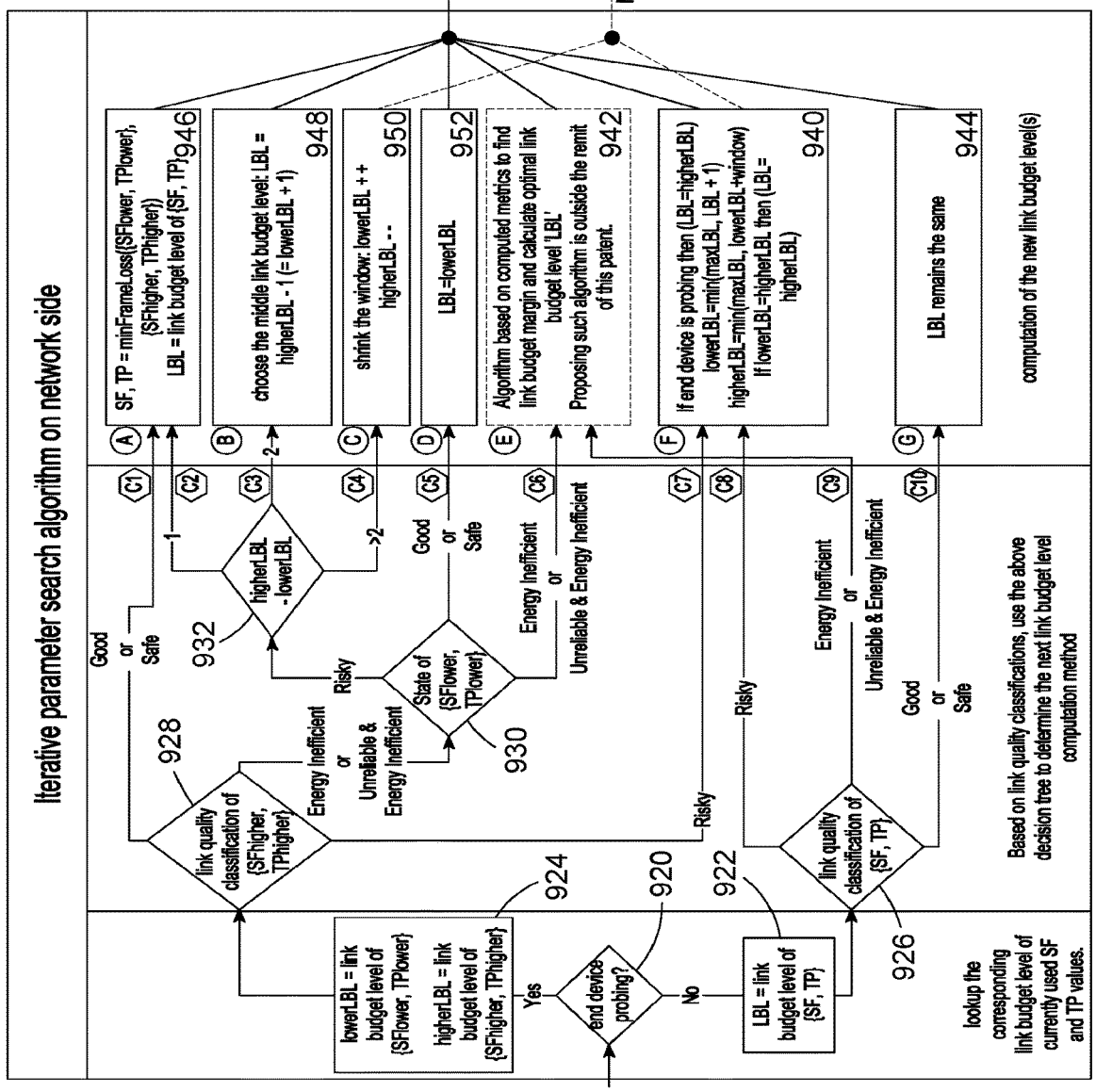
FIG. 12 shows a method for selecting a link budget level on a gateway (network device) according to an embodiment.

FIG. 12 shows a method for selecting a link budget level on a gateway (network device) according to an embodiment. This forms the iterative parameter search algorithm for the network side.

The whole method can be summarized into three different sections.

The first section is responsible for finding the corresponding link budget level(s) for the currently used transmission parameter setting(s) (e.g. based on link budget levels of Table 2).

The second section consists of a decision tree which determines the link quality classification(s) and determines what action (calculation method) to take to update the link budget(s) based on the condition of the link.

In the third section of iterative search method, the different link budget computation methods are implemented to determine updated link budget level(s). The selection of a computation method depends on the result of the link quality classification in the second step.

The updated link budget level(s) are then passed to the collision aware radio resource allocation module to determine the transmission parameters. Once these are determined, the transmission parameters are communicated to the node in a downlink message.

FIG. 12 shows seven different computation methods (labelled from A to G) that may be implemented in the third step, ten distinct conditions (labelled C1-C10) that may be determined in the second step, and a mapping between the computation methods and conditions. Each potential computation method is described below, along with the corresponding rationale behind the why different conditions map to these computation methods, before the overall method of FIG. 12 is explained.

Method A: When a node is probing with two parameter settings, Method A selects the link budget level with the setting with the highest reliability among the two. This method is adopted for two conditions (C1 and C2):

C1: When the parameter setting associated with the higher link budget results in packet receptions with RSSI in the Good or Safe regions. Therefore, choosing higher link budget level is acceptable but if lower link budget provides even better reliability then Method A would choose lower link budget level instead to save energy for future transmissions.

C2: When the parameter settings associated with the higher link budget level results in energy inefficient and/or unreliable transmissions
AND
the parameter settings associated with the lower link budget level results in packet receptions with an RSSI that is too close to the receiver sensitivity threshold (i.e. the Risky classification), implying that the optimal link budget level falls somewhere in between the lower and higher link budget
AND
the two link budget levels are adjacent to each other, with no other link budget level in between
THEN
Method A enables the higher or lower link budget level to be chosen based on reliability (frame loss), as no further adjustment to the link budget levels is possible.

Methods B-C: These methods enable the selection of the optimal setting that lies in between the two link budget levels corresponding to parameter settings chosen for the probing process. Method B selects the middle link budget level where the higher and lower link budget levels are separated by two (i.e. link budget level is set to the higher link budget level minus one or the lower link budget level plus one). Method C shrinks the window by increasing the lower link budget level by one and the reducing the higher link budget level by one. These methods are adopted in two conditions:

C3: This condition is the same as C2 with the exception that there is only one link budget level in between the two previously chosen link budget levels for probing. In this case, Method B selects the link budget level between the previous two link budget levels.

C4: This condition is the same as C2 with the exception that there are two or more link budget levels in between the two previously chosen link budget levels for probing. In this case, Method C will suggest probing with a higher link budget which is one level below the previous higher link budget level and a lower link budget level which is one level above the previous lower link budget level.

In other words, Methods B and C shrink the searching space for probing for the optimal parameter settings.

Method D: This method selects the lower link budget level as the new optimal setting. This method is adopted under one condition:

C5: If the lower link budget level setting is in the Safe/Good classification and the higher link budget level setting is not (i.e. the higher link budget level is energy inefficient, or unreliable and energy inefficient). In this case, the lower link budget level is selected.

Method E: When a node sends packets using the one (or two) parameter setting(s) that (both) provides a higher link budget than optimal (e.g. an inefficient link budget) then the current parameter settings are adapted to reduce the link budget level. The size of the reduction in link budget level can be based on the received signal strength. The RSSI or signal strength of the received packets compared to the receiver sensitivity (the difference between the RSSI and the minimum RSSI) can be used to calculate a link budget margin. The link budget level is then reduced by this margin to improve energy efficiency whilst still ensuring reliable communication. The specifics of this method is outside the remit of the patent application. Any appropriate method for reducing the link budget level can be applied in this scenario. For instance, each link budget level can be reduced by a predefined amount (e.g. two or more link budget levels). Method E is applied under two conditions:

C6: When the node is transmitting packets during the probing process using two settings and both settings are energy inefficient. The optimal link budget level is therefore the current link budget levels and so each of the link budget levels is reduced.

C9: When only one parameter setting is used by the node (without probing) this setting is energy inefficient. The optimal link budget level is therefore below the current link budget level and so the link budget level is reduced.

Method F: This method increases the link budget level beyond the one or the two chosen link budget level(s) because the latter are below the optimal link budget level. This step is the same as that applied in the equivalent node-side method (see step 916 of FIG. 11). In this case, the method suggests probing with the two new link budget levels which are separated by a predefined window. The difference between the two link budget levels is called the window size. Furthermore, the new lower link budget level is a step size (in this case 1) above the previous higher link budget level and new higher link budget level will be separated from the new lower link budget level by the window size. Both the higher and lower link budget levels cannot go beyond the maximum link budget level. If both the higher and lower link budget levels reach the maximum link budget level, then only a single link budget level equal to the maximum link budget level is selected. Method F is applied under two conditions:

C7: Probing is being applied by the node and the parameter setting associated with the higher link budget level results in packet receptions with an RSSI that is too close to the receiver sensitivity threshold (i.e. the Risky classification). In this case, the method increases probing link budget level(s) as per Method F.

C8: Probing is not being applied by the node and the parameter setting associated with current link budget level results in packet receptions with an RSSI that is too close to the receiver sensitivity threshold (i.e. the Risky classification). In this case, the method increases probing link budget level(s) as per Method F.

Method G: The same link budget level associated with the previous parameter settings is suggested if the packets are received with an RSSI or signal strength in the Good or Safe regions. This action is taken under one condition:

C10: When the node is not probing and the packet receptions belonging to the single parameter setting falls within the Good/Safe region. In this case, the network suggests that the link budget level is kept the same.

With regard to the specific method of FIG. 12, the method begins with the gateway determining whether the node is currently probing 920. This is based on whether two or more transmissions have been received (e.g. a higher and a lower link budget transmission).

If the node is not probing, then the gateway determines the link budget level of the single received transmission 922. Each transmission from the node includes data indicating the transmission parameters. For instance, the SF and TP values may be included in each transmission from the node. Alternatively, the TP may be included in the transmission and the SF value may be determined on the network side when decoding the transmission. This allows the gateway to determine the link budget level that was used for that transmission (e.g. by looking up the link budget level classification for the transmission parameters from memory).

Conversely, if the node is probing, then the gateway determines the link budget level for each received transmission 924. This applies the same method of 922; however, performs this for each of the probing transmissions to determine a higher and a lower budget level. The lower budget level is the budget level of the lower transmission parameters. The higher budget level is the budget level of the higher transmission parameters.

The gateway then performs link quality classification. If no probing is being performed, then the link quality classification is performed on the determined link budget level 926 for the received transmission. If probing is being performed, then the link quality classification is performed on the higher link budget level 928. The link quality classification determines whether the link quality falls within the 'Risky', 'Safe', 'Good', 'Unreliable & Energy Inefficient' or 'Energy Inefficient' regions. As discussed in detail with regard to FIGS. 7 and 8, this may be based on improved link quality metrics such as maximum RSSI, average RSSI, variation in RSSI and frame loss ratio. Having said this, alternative embodiments implement simpler link quality classification mechanisms, for instance, based solely on signal strength and/or (average) signal to noise ratio.

If no probing is being applied and the link quality is deemed to be risky (e.g. the received signal strength is too close to the minimum received signal strength and the frame loss is above a frame loss threshold), then the link budget is increased 940 in accordance with Method F. This can propose either one new link budget, or two link budgets for probing, depending on how close the budget is to the maximum link budget.

If no probing is being applied and the link quality is deemed energy inefficient or unreliable and energy inefficient, then the link budget is reduced 942 in accordance with Method E.

If no probing is being applied and the link quality is deemed to be good or safe, then the link budget is kept the same 944 (Method G).

If probing is being used and the link quality is deemed to be good or safe, then the method determines which of the probing transmissions has the lowest frame loss (e.g. smallest frame loss ratio) and selects the link budget that resulted in the lowest frame loss 946 (Method A).

If probing is being applied and the link quality is deemed energy inefficient, or unreliable and energy inefficient, then the gateway determines the link quality of the lower link budget transmission 930.

If the lower link budget transmission is deemed energy inefficient, or unreliable and energy inefficient, then the method moves to step 942 to reduce the link budget in accordance with Method E.

If the lower link budget transmission is deemed good or safe then the lower link budget level is selected as the link budget level for future transmissions 952 (Method D).

If the lower link budget transmission is deemed to be risky, then the method determines the difference between the higher and lower link budgets 932.

If the difference is one, then the method moves to step 946 to select the link budget level with the lowest frame loss (Method A). If the difference is two, then the middle link budget level is selected 948 (Method B). If the difference is greater than two, then the size of the window is decreased by increasing the lower link budget level and decreasing the higher link budget level 950 (Method C).

Once the next link budget level(s) have been determined, these are mapped to their corresponding transmission parameters 960. This may utilise collision aware radio resource allocation as discussed above to select the spread factor (or other coding method) that has the highest probability of success. The determined transmission parameters are then communicated to the node.

In light of the above, by sending two probing packets with different transmission parameter combinations and using evaluation results from link quality awareness to determine parameter transmission the efficiency and speed of locating the suitable transmission parameters can be improved.

Figure 13:
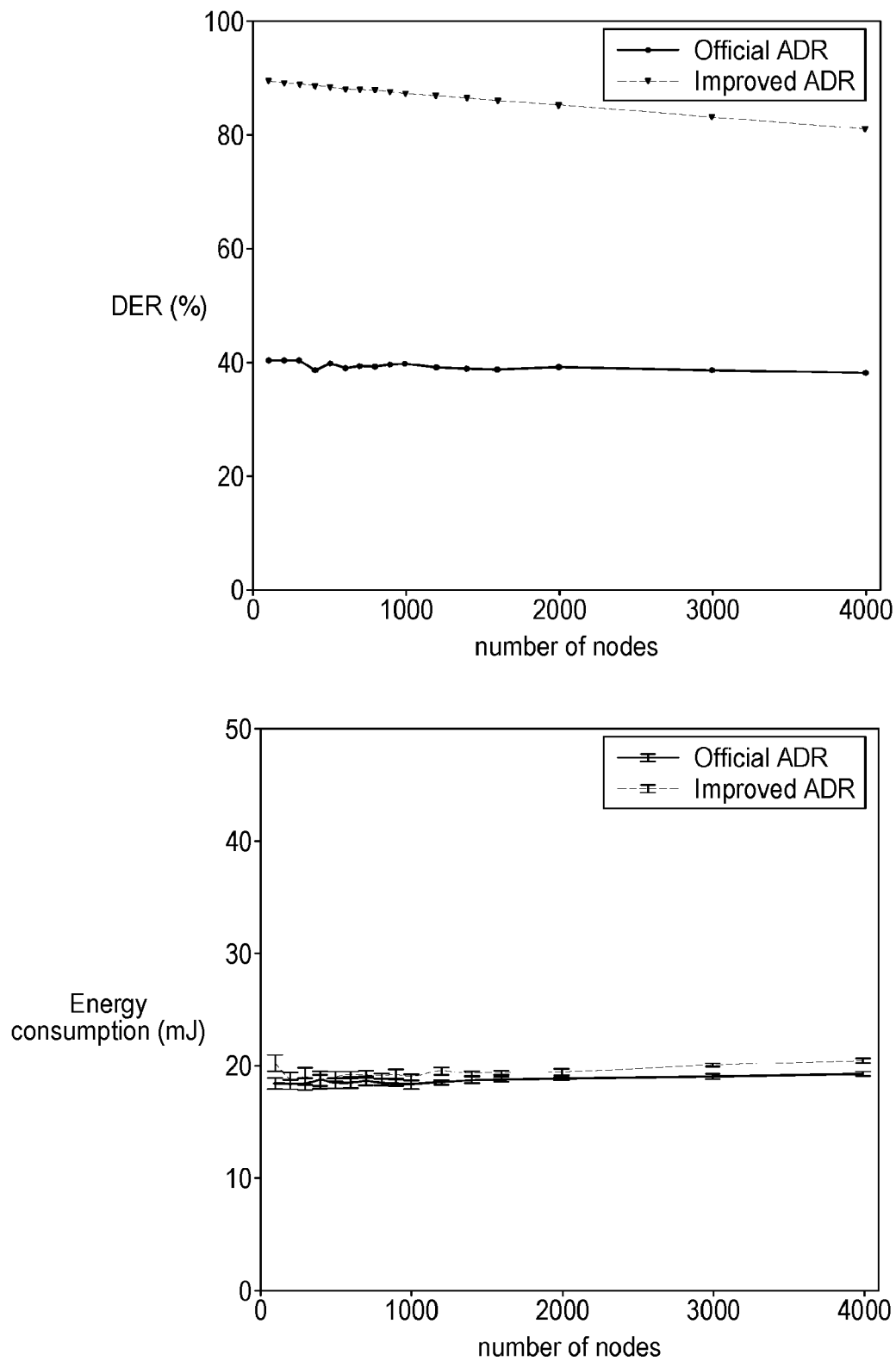
FIG. 13 shows the data extraction rate (top) and energy consumption (bottom) plotted against the number of transmitted nodes for a previous ADR system (solid line) and an embodiment of the invention (dashed line)
Figure 14:
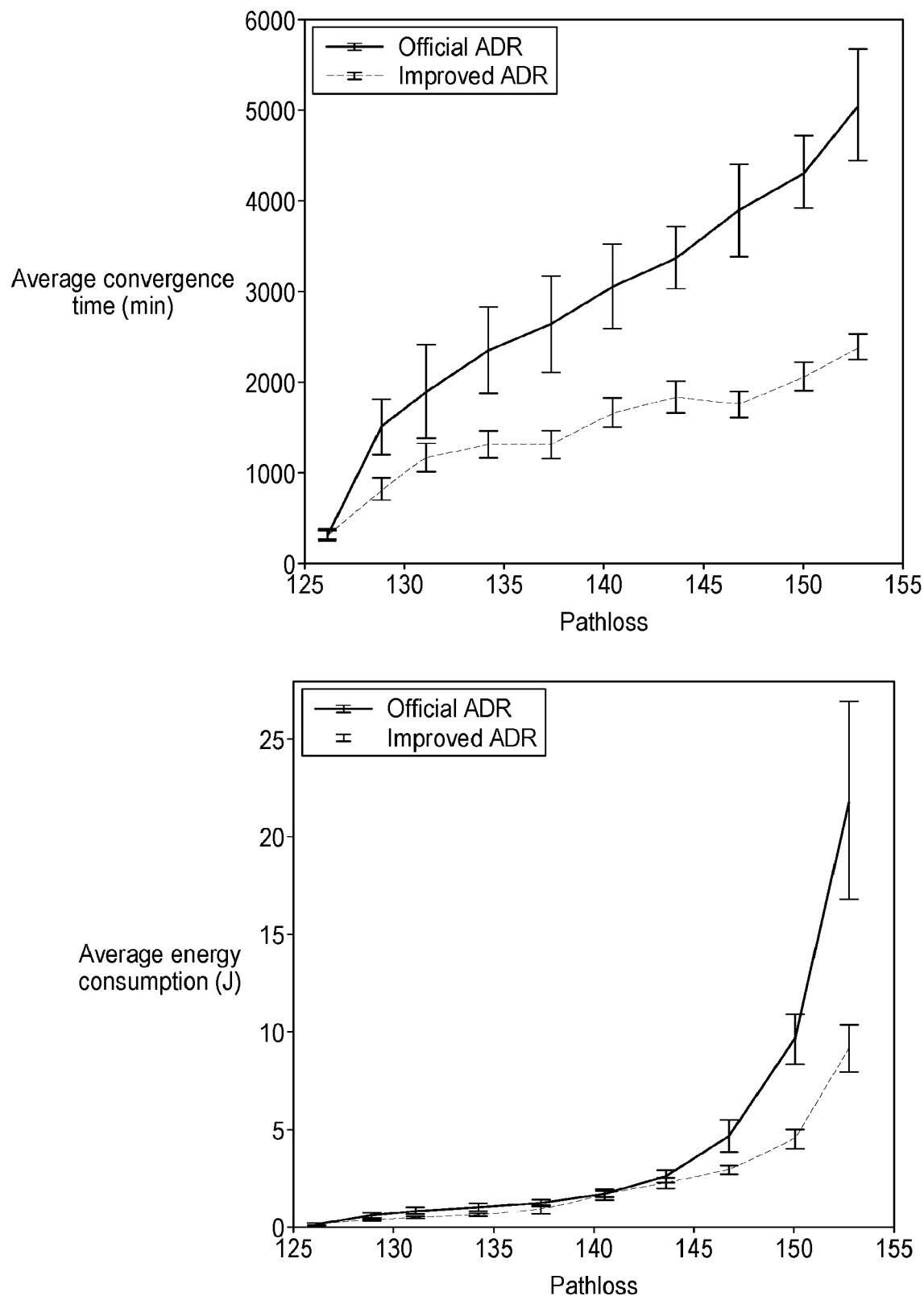
FIG. 14 shows the average convergence time (top) and average energy consumption (bottom) plotted against the pathloss for a previous ADR system (solid line) and an embodiment of the invention (dashed line).

FIGS. 13 and 14 show the resulting improvement in the performance from the ADR mechanism of the embodiments described herein.

FIG. 13 shows the data extraction rate (top) and energy consumption (bottom) plotted against the number of transmitted nodes for a previous ADR system (solid line) and an embodiment of the invention (dashed line).

The data extraction rate is the ratio of received packages to transmitted packages over a period of time. The energy consumption refers to the average energy consumption per successful transmission (in this case measured in mJ). The performance is evaluated under a scenario where the distribution of the nodes in the network permits optimisation (optimisation can be implemented without changing the link budget).

FIG. 14 shows the average convergence time (top) and average energy consumption (bottom) plotted against the pathloss for a previous ADR system (solid line) and an embodiment of the invention (dashed line). The convergence time is defined as the duration from the change in the link quality until when the network receives a sufficient number of packets to enable it to compute the new transmission parameters (new SF and TP values). The energy consumption is the amount of energy consumed by the radio during the computation of ADR.

The embodiments achieve several additional advantages:
Reduction of time taken to adjust the link quality given a change in link quality, meanwhile the energy cost is reduced.
Improvement in the data extraction rate of the network when a fading channel exists.
Collision is reduced when network size is large. As a result, the data extraction rate does not drop significantly as the network size grows.
A more accurate detection for link quality leads to a network with higher data extraction rate.

Accordingly, by improving the accuracy of link quality assessment (link quality awareness for uplinks from nodes to gateways), the system is more responsive to changes in link quality and is able to adjust performance more accurately, thereby increasing the efficiency of the system. Furthermore, by allowing probing using multiple transmissions, each relating to a different set of transmission parameters (parameters probing and searching for agile link quality adaptation), the system is able to adapt the transmission parameters more quickly, thereby speeding up the determination of appropriate transmission parameters, further improving the efficiency of the system.

Various mechanisms are described for efficiently selecting the most appropriate link budget level(s) and for narrowing the search window until the transmission parameters with the best performance are identified.

Whilst the above embodiments are discussed with regard to low power wide area wireless networks, such as LoRaWAN, the methods described herein are applicable to a variety of wireless communication schemes and in general, any scheme that includes transmission between two wireless devices.

Accordingly, whilst the embodiments are described with regard to gateways (e.g. access points) and end devices (e.g. nodes), this could equally apply to a first wireless device that monitors transmission metrics from a second wireless device and adjusts the parameters of the second wireless device accordingly. The second device may apply the same process for the first device.

Accordingly, the embodiments described herein are not limited to the selection of transmission power and spreading factor, but are equally applicable to the adaptation of any transmission parameters that affect the power consumption of the transmitting device and the probability of successful receipt. For instance, instead of varying spreading factor, a coding scheme, or transmission channel (e.g. frequency channel) may be varied.

Furthermore, whilst the application refers to that adaptation of 'link budget levels', this term is not limited to a specific mapping of link budget levels to transmission parameters, but is instead generalized to include any grouping or classification of transmission parameters that have a similar ability to reach the gateway.

While certain arrangements have been described, the arrangements have been presented by way of example only, and are not intended to limit the scope of the inventions. Indeed, the novel methods and devices described herein may be embodied in a variety of other forms; furthermore, various omissions, substitutions and changes in the form of the methods and systems described herein may be made.

The invention claimed is:

1. A wireless apparatus comprising:
a wireless interface configured to perform wireless communications over a communication link with a further wireless apparatus; and
a controller configured to:
cause the wireless interface to transmit to the further wireless apparatus one or more signals using a first transmission setting;
determine whether a link quality of the communication link falls outside of a predefined range; and
in response to determining that the link quality falls outside of the predefined range:
determine at least first and second probing transmission settings that differ from each other and from the first transmission setting;
cause the wireless interface to transmit to the further wireless apparatus a first probing signal using the first probing transmission setting and a second probing signal using the second probing transmission setting; and
after both of the first probing signal and the second probing signal are transmitted to the further wireless apparatus, obtain a message that designates which of the first and second probing transmission settings is to be used in transmissions to the further wireless apparatus, the message being transmitted by the further wireless apparatus; and
apply to the wireless interface one of the first and second probing transmission settings designated by the message with future transmissions to the further wireless apparatus.

2. The wireless apparatus of claim 1, wherein when the first transmission setting falls within a first link budget,
determining whether the link quality of the communication link falls outside of the predefined range includes determining whether the link quality falls below a minimum link quality; and
the controller is configured to, in response to determining that the link quality falls below the minimum link quality, determine the first and second probing transmission settings such that each of the first and second probing transmission settings provides a link budget that is higher than the first link budget.

3. The wireless apparatus of claim 2, wherein determining the first and second probing transmission settings such that each of the first and second probing transmission settings provides a link budget that is higher than the first link budget includes:
determining a first probing link budget for the first probing transmission setting that is higher than the first link budget by a predefined step size;
determining a second probing link budget for the second probing transmission setting that is higher than the first probing link budget by a predefined window; and
determining the first and second probing transmission settings based on the first and second probing link budgets respectively.

4. The wireless apparatus of claim 3, wherein determining the first and second probing transmission settings based on the first and second probing link budgets respectively includes:
in response to the first probing link budget being below a maximum link budget, selecting for the first probing transmission setting a transmission setting falling within the first probing link budget;
in response to the second probing link budget being below the maximum link budget, selecting for the second probing transmission setting a transmission setting falling within the second probing link budget; and
in response to one or both of the first and second probing link budgets being greater than or equal to the maximum link budget, selecting for the one or both of the first and second probing link budgets a corresponding transmission setting falling within the maximum link budget.

5. The wireless apparatus of claim 2, wherein determining whether the link quality falls below a minimum link quality includes determining whether a predefined number of transmission attempts have been made by the wireless apparatus using the first transmission settings without receiving any acknowledgement of receipt from the further wireless apparatus.

6. The wireless apparatus of claim 1, wherein determining whether the link quality of the communication link falls outside of the predefined range includes receiving an indication from the further wireless apparatus that the link quality falls outside of the predefined range.

7. The wireless apparatus of claim 1, wherein each of the first transmission setting and the first and second probing transmission settings includes one or more of a transmission power setting and a coding scheme setting.

8. The wireless apparatus of claim 1, wherein the wireless interface receives from the further wireless apparatus one or more signals that indicate both of the first and second probing transmission settings, and the controller determines at least the first and second probing transmission settings based on the received signals.

9. A method comprising:
in response to receipt of one or more uplink signals from a first wireless apparatus over a wireless communication link, the one or more uplink signals being transmitted to a second wireless apparatus by the first wireless apparatus using a first transmission setting,
determining, by the second wireless apparatus, whether a link quality of the wireless communication link falls outside of a predefined range,
in response to determining that the link quality falls outside of the predefined range:
determining, by the second wireless apparatus, at least first and second probing transmission settings that differ from each other and from the first transmission setting;
sending by the second wireless apparatus, to the first wireless apparatus an instruction for the first wireless apparatus to use the first probing transmission setting in a first probing transmission and the second probing transmission setting in a second probing transmission;
after both of the first probing transmission and the second probing transmission are to received from the first wireless apparatus, and in response to receipt of the first and second probing transmissions, determining, by the second wireless apparatus, a first probing link quality for the first probing transmission and a second probing link quality for the second probing transmission;

selecting, by the second wireless apparatus, one of the first and second probing transmission settings based on the first probing link quality and the second probing link quality; and sending, by the second wireless apparatus, to the first wireless apparatus an instruction for the first wireless apparatus to use the selected one of the first and second probing transmission settings in future transmissions.

10. The method of claim 9, wherein:
the one or more uplink signals are sent by the first wireless apparatus using one or more link budgets,
determining whether the link quality falls outside of the predefined range includes determining whether a link quality of the largest link budget of the one or more link budgets falls below the predefined range; and
in response to determining that the largest of the link budgets falls below the predefined range, the first and the second probing transmission settings are determined such that each of the first and second probing transmission settings provides a link budget that is higher than the largest of the link budgets.

11. The method of claim 10, wherein determining the first and second probing transmission settings such that each of the first and second probing transmission settings provides a link budget that is higher than the largest of the link budgets includes:
determining a first probing link budget for the first probing transmission setting that is higher than the first link budget by a predefined step size;
determining a second probing link budget for the second probing transmission setting that is higher than the largest probing link budget by a predefined window; and
determining the first and second probing transmission settings based on the first and second probing link budgets respectively.

12. The method of claim 11, wherein determining the first and second probing transmission settings based on the first and second probing link budgets respectively includes:
in response to the first probing link budget being below a maximum link budget, selecting for the first probing transmission setting a transmission setting falling within the first probing link budget,
in response to the second probing link budget being below the maximum link budget, selecting for the second probing transmission setting a transmission setting falling within the second probing link budget; and
in response to one or both of the first and second probing link budgets being greater than or equal to the maximum link budget, selecting for the one or both of the first and second probing link budgets a corresponding transmission setting falling within the maximum link budget.

13. The method of claim 12, wherein determining whether a link quality of the largest link budget of the one or more link budgets falls below the predefined range includes determining whether a received signal strength corresponding to the largest link budget is less than a lower limit for the signal strength.

14. The method of claim 9, wherein:
the one or more uplink signals are sent by the first wireless apparatus using one or more link budgets;
determining whether the link quality falls outside of the predefined range includes determining whether a link quality of the smallest link budget of the one or more link budgets falls above the predefined range; and
in response to determining that the smallest of the link budgets falls above the predefined range, the first and the second probing transmission settings are determined such that each of the first and second probing transmission settings provides a link budget that is lower than the smallest of the link budgets.

15. The method of claim 14, wherein determining whether the link quality of the smallest link budget of the one or more link budgets falls above the predefined range includes determining whether a received signal strength corresponding to the smallest link budget is greater than an upper limit for the signal strength.

16. The method of claim 9, wherein selecting one of the first and second probing transmission settings based on the first probing link quality and the second probing link quality includes, in response to the link quality for each of the first and second probing transmissions falling within the predefined range, selecting the one of the first and second probing transmission settings that provides the lowest frame loss.

17. A non-transitory computer readable medium comprising executable code that, when executed by a processor, causes the processor to perform the method of claim 9.

18. A computing system comprising a processor configured to perform the method of claim 9.

19. A method comprising:
transmitting, by a first wireless apparatus, to a second wireless apparatus one or more uplink signals using a first transmission setting;
determining, by the first wireless apparatus, whether a link quality of the communication link falls outside of a predefined range; and
in response to determining that the link quality falls outside of the predefined range:
determining, by the first wireless apparatus, at least first and second probing transmission settings that differ from each other and from the first transmission setting;
transmitting, by the first wireless apparatus, to the second wireless apparatus a first probing signal using the first probing transmission setting and a second probing signal using the second probing transmission setting;
after both of the first probing signal and the second probing signal are transmitted to the second wireless apparatus, receiving, by the first wireless apparatus, from the second wireless apparatus a message that indicates which of the first and second probing transmission settings is to be used in transmissions to the second wireless apparatus; and
applying, by the first wireless apparatus, to a wireless interface one of the first and second probing transmission settings designated by the message for use with future transmissions to the second wireless apparatus.

20. A non-transitory computer readable medium comprising executable code that, when executed by a processor, causes the processor to perform the method of claim 19.

* * * * *